US008079295B2

(12) United States Patent
Gass

(10) Patent No.: US 8,079,295 B2
(45) Date of Patent: Dec. 20, 2011

(54) TABLE SAW BLADE GUARDS AND BLADE GUARD ASSEMBLIES INCLUDING LATERAL BLADE GUARDS, AND TABLE SAWS INCLUDING THE SAME

(75) Inventor: Stephen F. Gass, Wilsonville, OR (US)

(73) Assignee: SD3, LLC, Tualatin, OR (US)

( * ) Notice: Subject to any disclaimer, the term of this patent is extended or adjusted under 35 U.S.C. 154(b) by 538 days.

(21) Appl. No.: 12/214,562

(22) Filed: Jun. 20, 2008

(65) Prior Publication Data

US 2009/0314148 A1 Dec. 24, 2009

(51) Int. Cl.
*B23B 45/06* (2006.01)
*B26D 1/14* (2006.01)

(52) U.S. Cl. .......................................... 83/478; 83/477.2

(58) Field of Classification Search ................. 83/477.2, 83/490, 581, 478, 102.1, 440.2, 471.2
See application file for complete search history.

(56) References Cited

U.S. PATENT DOCUMENTS

| | | | | |
|---|---|---|---|---|
| 162,814 | A | 5/1875 | Graves et al. | |
| 264,412 | A | 9/1882 | Kuhlmann | |
| 299,480 | A | 5/1884 | Kuhlman et al. | |
| 307,112 | A | 10/1884 | Groff | |
| 545,504 | A | 9/1895 | Hoover | |
| 713,196 | A | 11/1902 | Bennett | |
| 997,720 | A | 7/1911 | Troupenat | |
| 1,037,843 | A | 9/1912 | Ackley | |
| 1,082,870 | A | 12/1913 | Humason | |
| 1,148,169 | A | 7/1915 | Howe | |
| 1,244,187 | A | 10/1917 | Frisbie | |
| 1,496,212 | A | 6/1924 | French | |
| 1,511,797 | A | 10/1924 | Berghold | |
| 1,563,317 | A | 12/1925 | Auel | |
| 1,774,521 | A | 9/1930 | Neighbour | |
| 2,007,887 | A * | 7/1935 | Tautz | 83/102.1 |
| 2,075,282 | A | 3/1937 | Hedgpeth | |
| 2,095,330 | A | 10/1937 | Hedgpeth | |
| 2,121,069 | A | 6/1938 | Collins | |

(Continued)

FOREIGN PATENT DOCUMENTS

DE 3137732 9/1983

(Continued)

OTHER PUBLICATIONS

The INCA Woodworking Machinery Handbook—With Useful Tips and Jigs for Everyone, *INCA Maschinen*, 1984.

(Continued)

*Primary Examiner* — Ghassem Alie

(57) ABSTRACT

Table saw blade guards with lateral guards, blade guard assemblies, and table saws including the same. The blade guards include at least one lateral guard that restricts access to a lateral side, or face, of the saw's blade, and may include a top guard. The lateral guard is selectively moved, such as responsive to engagement by a workpiece, between a non-cutting position and a plurality of cutting positions. In some embodiments, the lateral guard is a collapsing lateral guard that has a reduced perimetrical area and/or reduced vertical dimension relative to the saw's work surface when in a cutting position compared to the non-cutting position. In some embodiments, the lateral guard collapses toward the top guard when moved from its non-cutting position to a cutting position. In some embodiments, the lateral guard does not, or does not appreciably, project above the top guard even when in its maximum cutting position.

22 Claims, 11 Drawing Sheets

U.S. PATENT DOCUMENTS

| | | | | |
|---|---|---|---|---|
| 2,352,235 | A | 6/1944 | Tautz | |
| 2,466,325 | A | 4/1949 | Ocenasek | |
| 2,572,326 | A | 10/1951 | Evans | |
| 2,593,596 | A | 4/1952 | Olson | |
| 4,453,112 | A | 6/1984 | Sauer et al. | |
| 4,721,023 | A | 1/1988 | Bartlett et al. | |
| 5,116,249 | A | 5/1992 | Shiotani et al. | |
| 5,123,317 | A | 6/1992 | Barnes, Jr. et al. | |
| 5,230,269 | A | 7/1993 | Shiotani et al. | |
| 5,231,906 | A | 8/1993 | Kogej | |
| 5,857,507 | A | 1/1999 | Puzio et al. | |
| 6,131,629 | A | 10/2000 | Puzio et al. | |
| 6,736,042 | B2 | 5/2004 | Behne et al. | |
| 6,796,208 | B1 | 9/2004 | Jorgensen | |
| 7,000,515 | B2 | 2/2006 | Jorgensen | |
| 7,437,981 | B2 | 10/2008 | Burke et al. | |
| 2001/0035081 | A1 | 11/2001 | Sutton | |
| 2002/0117037 | A1 * | 8/2002 | Sartori | 83/478 |
| 2004/0226424 | A1 | 11/2004 | O'Banion et al. | |
| 2004/0255745 | A1 | 12/2004 | Peot et al. | |
| 2005/0235793 | A1 | 10/2005 | O'Banion et al. | |
| 2007/0000366 | A1 | 1/2007 | Peot et al. | |
| 2007/0056416 | A1 * | 3/2007 | Shibata | 83/440.2 |
| 2007/0113714 | A1 | 5/2007 | Burke et al. | |
| 2007/0113715 | A1 | 5/2007 | Burke et al. | |
| 2007/0163408 | A1 | 7/2007 | Buck et al. | |
| 2007/0186739 | A1 | 8/2007 | Peot et al. | |
| 2007/0186741 | A1 | 8/2007 | Buck et al. | |
| 2007/0277661 | A1 | 12/2007 | Domeny et al. | |
| 2008/0022827 | A1 | 1/2008 | Weir et al. | |
| 2009/0044673 | A1 | 2/2009 | Liu et al. | |
| 2010/0147125 | A1 | 6/2010 | Stellman | |

FOREIGN PATENT DOCUMENTS

| | | |
|---|---|---|
| DE | 8807584 | 9/1988 |
| DE | 4205965 C1 | 2/1992 |
| DE | 9306198 | 4/1993 |
| WO | WO 03/006213 | 1/2003 |

OTHER PUBLICATIONS

SI16WA-WF Circular Saw with Tilting Blade Spare Parts Catalogue, SCMI Corporation, Norcross, GA, Nov. 1986 and 1991.
Inca 2200 Table Saw Photo of Internal Mechanisms, around 1992.
Inca 2100SE Blade Guard Photos, 1992.
Inca 2100SE Professional Tablesaw Owners Manual, Injecta Machinery, 1992.
Skil Model 3400-Type 1 10" Table Saw Parts List and Technical Bulletin, S-B Power Tool Company, Jun. 1993.
SI320 Circular with Tilting Blade Spare Parts Catalogue, SCM, Dec. 23, 1998.
SI3200/3800 Circular with Tilting Blade Spare Parts Catalogue, SCM, Dec. 23, 1998.
Grizzly Industrial, Inc. Heavy-Duty 12" Table Saw Model G5959 and G9957 Parts List, 1998 and Oct. 2001.
Altendorf publication, Wilhelm Altendorf GmbH & Co. KG Minden, Germany, 1999.
SI300N Circular with Tilting Blade Spare Parts Catalogue, SCM, Jun. 12, 2000.
Bosch Model 4000 Worksite Table Saw Operating/Safety Instructions, S-B Power Tool Company, Jul. 2000.
Two photographs of a saw displayed at a trade show on Aug. 23, 2000.
SI400N Circular with Tilting Blade Spare Parts Catalogue, SCM, Sep. 19, 2000.
DeWalt Woodworker's Table Saw DW746 Instruction Manual, DeWalt Industrial Tool Co., 2000.
SC 3W Circular Saw Manual, SCM Group S.p.A Divisione Minimax—Samco, Feb. 2001.
Ryobi 10" Table Saw BT3000 Operator's Manual, Ryobi Technologies, Inc., Mar. 2001.
SI450E Circular with Tilting Blade Spare Parts Catalogue, SCM, Apr. 26, 2001.
Bosch 10" Table Saw Model 0601476139 Parts List and Technical Bulletin, S-B Power Tool Company, Apr. 2001.
Powermatic 10" Tilting Arbor Saw Model 66 Instruction Manual & Parts List, JET Equipment & Tools, Jun. 2001.
Skil Model 3400 Table Saw Operating/Safety Instructions, S-B Power Tool Co., Sep. 2001.
Tablesaw Splitters and Blade Covers, *Fine Woodworking* pp. 77-81, Dec. 2001.
The Merlin Splitter by Excalibur a Sommerville Design Product Overview & Generic Installation Notes, Sommerville Design & Manufacturing Inc., at least as early as 2002.
Ryobi 10" Table Saw BT3100 Operator's Manual, Ryobi Technologies, Inc., Aug. 2002.
Rojek KPF 300A-xxxx-RN-1P3 Table Saw/Shaper Combination Machine specification sheet, Sep. 30, 2002.
Laguna Tools Signature Series by Knapp, Oct. 21, 2002.
Rojek Circular Saw PK 300 Spare part catalogue, Apr. 14, 2003.
Ridgid TS3650 Operators Manual 10" Cast Iron Table Saw, May 2003, Jun. 2003 and Jul. 15, 2003.
Porter-Cable Double Insulated 10" Bench Top Table Saw Instruction Manual, Porter-Cable Corporation, Sep. 15, 2003.
SI300S-SI300S4 Circular with Tilting Blade Spare Parts Catalogue, SCM, Oct. 30, 2003.
Delta Biesemeyer 10" Table Saw Blade Guard Systems Instruction Manual, Delta Machinery, May 9, 2005.
Powermatic WMH Tool Group Operating Instructions and Parts Manual 10-inch Cabinet Saw Model 2000, Nov. 2005.
Makita Model 2704 Exploded Drawings and Parts List, Nov. 2005.
Porter-Cable 10" Portable Table Saw 3812, Porter-Cable Corporation, 2005.
Porter Cable 10" Portable Table Saw Model 3812 Parts List with Guard Exploded View, 2005.
Grizzly Industrial, Inc. Model G0605X/G0606X Extreme Series 12" Table Saw Owner's Manual, Grizzly Industrial, Inc., Oct. 2006.
Riving Knives—Not Just for the Europeans Anymore, *Popular Woodworking*, Jul. 20, 2007.
WoodNet Forums Woodworking Talk Forum, posting dated Jan. 9, 2008.
Grizzly Industrial, Inc. Model G0651/G0652 10" Extreme Series Table Saws Owner's Manual, Grizzly Industrial, Inc., Mar. 2008.
SCM SI 450 Circular saw with tilting blade product brochure, Villa Verucchio, Italy, undated.
SCM Group publication, Rimini, Italy, undated.
Makita Table Saw 2704 Instruction Manual, Makita Corporation of America, date unknown.
Laguna Tools table saw owner's manual, date unknown.

* cited by examiner

TABLE SAW BLADE GUARDS AND BLADE GUARD ASSEMBLIES INCLUDING LATERAL BLADE GUARDS, AND TABLE SAWS INCLUDING THE SAME

FIELD OF THE DISCLOSURE

The present disclosure is directed generally to table saw blade guards having lateral guards for restricting access to the side of a saw blade, and to table saw blade guard assemblies and table saws that include the same.

BACKGROUND OF THE DISCLOSURE

A table saw is a power tool used to cut a workpiece to a desired size or shape. The workpiece may be formed from a variety of materials, including wood, laminates, plastic, metal, combinations thereof, and the like. A table saw includes a work surface, or table, and a circular blade extending up through the table. A person uses a table saw by holding a workpiece on the infeed region of the table's work surface and feeding it past the spinning blade to make a cut in the workpiece.

The table saw is an essential piece of woodworking equipment and has been so for decades. Despite the long-time and widespread use of table saws, the blade of a table saw presents a considerable risk of injury to a user of the saw. If the user accidentally places the user's hand in the path of the blade, or if the user's hand slips or is otherwise thrust into contact with the blade, then the user could receive a serious injury or amputation. Accidents also happen because of what is called kickback. Kickback may occur when a workpiece contacts the downstream edge of the blade as it is being cut. The blade then propels the workpiece back toward the user at a high velocity. When this happens, the user's hand may be conveyed into the blade because of the sudden and unexpected movement of the workpiece. Additionally, the user may be injured when contacted by the workpiece that is propelled toward the user by the spinning blade.

Safety systems or features may be incorporated into table saws to reduce the risk of injury. A conventional safety feature is a blade guard that physically blocks an operator from making contact with at least a portion of the blade. Conventional blade guards reduce the risk of injury, when used, but often are considered by users to be bulky, to be inconvenient to use, and/or to obstruct the user's view of the workpiece as the workpiece is being cut by the spinning blade of the table saw. Other safety devices that are sometimes incorporated into table saws are a riving knife and a splitter. A riving knife is positioned closely behind the outfeed region of the blade to prevent the cut portions of the workpiece from contacting the outfeed region of the spinning blade. A riving knife typically extends above the work surface of a table saw to a lesser extent than the blade. A splitter is a flat plate, similar to a riving knife, but typically extending above the top-to-bottom cutting capacity of the blade so that a blade guard can be mounted thereto. Some splitters and/or blade guards include anti-kickback devices that are configured to restrict a workpiece from being propelled back toward a user by the spinning blade. An illustrative example of a conventional anti-kickback device is an anti-kickback pawl, which is a toothed pawl that is positioned to oppose a workpiece being thrown back toward a user.

Other safety systems have been developed to detect when a human body contacts a predetermined portion of a machine, such as detecting when a user's hand touches the moving blade of a saw. When that contact is detected, the safety systems react to minimize injury. These systems may be used in conjunction with table saw attachments such as blade guards, riving knives, splitters, and anti-kickback pawls.

The present document discloses improved table saw blade guards that include a lateral guard, and to blade guard assemblies and table saws that include the same.

DETAILED DESCRIPTION AND BEST MODE OF THE DISCLOSURE

Figure 1:
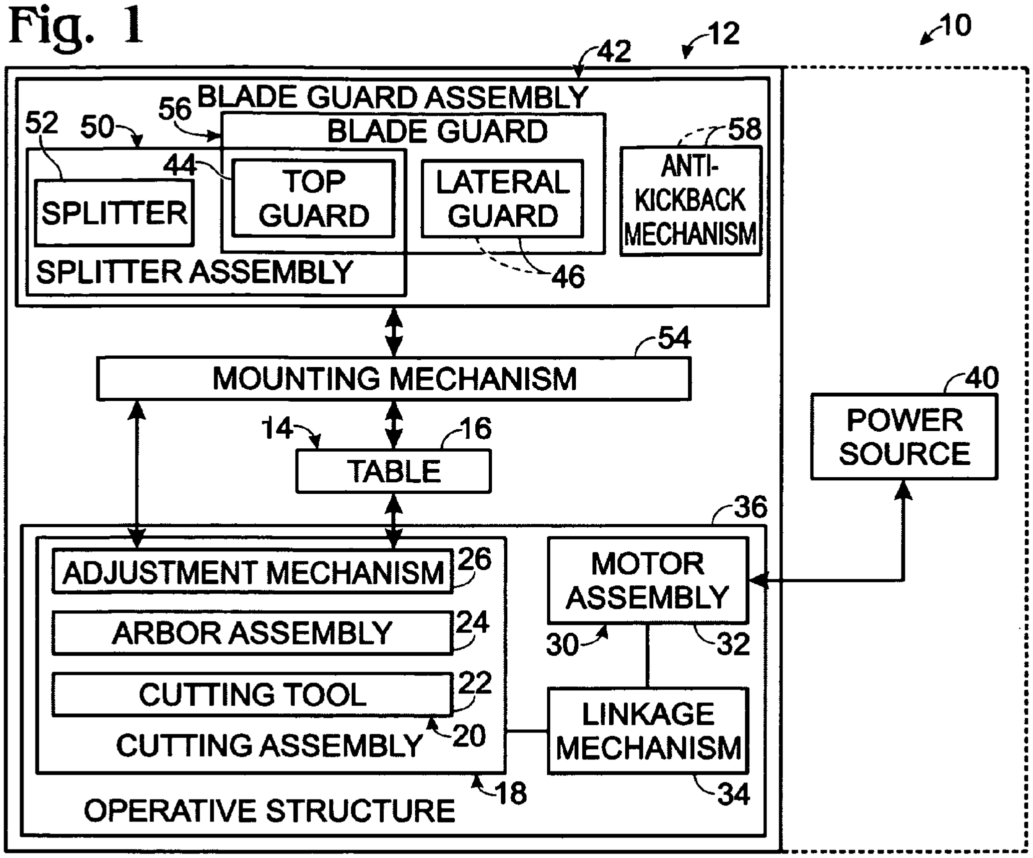
FIG. 1 is a schematic diagram of an illustrative, non-exclusive example of a table saw that may incorporate or be used with table saw blade guard assemblies according to the present disclosure.

An illustrative, non-exclusive example of a table saw 10 with which the blade guard assemblies described and/or illustrated herein may be used or otherwise incorporated is schematically illustrated in FIG. 1 and generally indicated at 10. Table saw 10 includes a housing, or body, 12 with a table 14 that defines a work surface 16. Work surface 16 typically is a planar, horizontally oriented surface that supports a workpiece to be cut by the table saw. The size of the work surface may vary, such as depending upon the size and power output of the table saw, with illustrative examples ranging from approximately a few hundred square inches to approximately a thousand square inches to several thousand square inches. Illustrative, non-exclusive examples of workpieces that may be cut with table saw 10 include wood, laminates, composite materials, plastic, metal, and combinations thereof.

Table saw 10 includes a cutting assembly 18 that is adapted to cut a workpiece as the workpiece is contacted by the cutting assembly during powered operation of the table saw. Cutting assembly 18 includes a cutting tool 20, such as a blade 22, which extends at least partially above the work surface when the table saw is used to cut a workpiece. For the purpose of simplicity, the following discussion will refer to the cutting tool as being a circular saw blade. However, other cutting tools may be utilized without departing from the scope of the present disclosure. Blade 22 has a circular, or nominally circular, shape and has opposed sides. Blade 22 typically with a plurality of teeth, or cutting surfaces, that extend around the perimetrical edge of the blade to define a cutting region of the blade and which are oriented to cut the workpiece as the blade is rotated and contacted by the workpiece.

Cutting assembly 18 may include an arbor, or arbor assembly, 24 upon which the blade is supported relative to the work surface. The maximum distance that the blade extends above the work surface may be fixed, although cutting assembly 18 and/or table saw 10 more typically includes a blade adjustment mechanism 26 that enables adjustment of the height that the blade extends above the work surface and/or the angle at which the plane, or faces, of the blade extend(s) relative to the work surface. Typically, the adjustment mechanism enables the height of the blade to be selectively positioned so that the top of the blade is positioned anywhere from completely below the work surface to a maximum cutting depth above the work surface, as well as allowing the blade to be tilted from perpendicular to 45-degrees relative to the work surface. Blade adjustment mechanism 26 may be described as being configured to change the orientation of the blade relative to the work surface, such as by raising, lowering, and/or tilting the blade relative to the work surface. Blade adjustment mechanism 26 may include any suitable mechanism or structure for producing this movement of the blade within a range of operable positions, such as responsive to user inputs to one or more user controls. Blade adjustment mechanism 26 may be referred to as just an adjustment mechanism, such as when used with cutting tools other than blades.

Some table saws include a work surface that is stationary, or fixed, in relative position with respect to the non-rotating blade, while others may include a work surface that is configured to slide, or translate, relative to the blade and/or rest of the body of the table saw. In the former embodiment, the workpiece is cut by sliding it along the work surface and into contact with the spinning blade. In the latter embodiment, the workpiece is supported upon the work surface, and then the work surface and workpiece are slid as a unit to bring the workpiece into contact with the spinning blade. This latter type of table saw may be referred to as a sliding table saw.

Table saw 10 includes a motor assembly 30 having at least one motor 32 that is adapted to drive the rotation of the blade or other cutting tool such that the workpiece is cut when it is moved into contact with the spinning blade or other cutting tool. The rotational output of the motor assembly is directly or indirectly coupled to the blade to drive the rotation of the blade. For example, table saw 10 may include a suitable linkage mechanism 34, such as one or more belts, gears, pulleys, and the like, that convey the rotational output of the motor assembly to the blade to cause rotation of the blade. In many table saws, the motor assembly drives the rotation of the arbor assembly upon which the blade is supported. Rotation of the arbor assembly results in rotation of the blade. Motor assembly 30, cutting assembly 18, and linkage mechanism 34 (if present) may collectively be referred to herein as an operative structure, or operative cutting structure, 36 of the table saw.

Motor assembly 30 is powered by a power source 40, such as a suitable electrical power source. Power source 40 may be an external power source, such as line current, or an internal power source, such as a battery. Alternatively, power source 40 may include a combination of both external and internal power sources. Furthermore, power source 40 may include two or more separate power sources, each adapted to power different portions of table saw 10.

Also schematically illustrated in FIG. 1 is a blade guard assembly 42. Blade guard assembly 42 includes a blade guard 56 and may include a splitter 52. Blade guard 56 is configured to restrict user access to the blade, such as when the blade is being used to cut a workpiece on the work surface. Accordingly, the blade guard is positioned proximate to the blade to prevent a user's body from contacting at least portions of the blade, such as the teeth or other cutting surface thereof. As indicated in FIG. 1, blade guard 56 includes at least one lateral guard 46 and may include a top guard 44. As their names respectively imply, lateral guard 46 is configured to be positioned proximate a lateral face of the blade and top guard 44, when present, is adapted to be positioned above, or at least generally above, the blade.

Lateral guard(s) 46 may extend (generally) parallel to the faces of the blade, and top guard 44 may extend (generally) perpendicular to the faces of the blade, but these general orientations are not required to all embodiments of blade guard assemblies according to the present disclosure. The lateral guard(s) and top guard (when present) individually and collectively restrict a user's body from being able to contact, or otherwise physically access, the blade, and especially the teeth or other cutting surfaces thereof, when the blade is spinning and the blade guard is positioned in an operative position relative to the blade. As used herein, an operative position of the blade guard refers to when the blade guard is positioned to obstruct physical access to the spinning blade, such as while a workpiece on the work surface is being cut by the blade.

It is within the scope of the present disclosure that blade guards and blade guard assemblies may include a splitter and at least one guard member, such as at least one lateral guard, but may be formed without a top guard or at least without a top guard that defines a continuous top guard surface that extends above and covers the top of the blade. In some embodiments, the top guard may include one or more openings, passages, voids, or other open regions, as opposed to a completely solid top guard. In some embodiments, the blade guard may include at least a pair of lateral guards, which include upper lateral regions that individually or collectively extend above and proximate the top of the blade to restrict access thereto from above the blade and to thereby functionally provide a top guard.

Splitter 52 is positioned rearward of the blade so that the workpiece passes by the splitter after it has been cut by the blade. Splitter 52 functions to maintain separation between the regions of the workpiece that have been cut by the blade, such as to prevent these regions from impinging upon the rear surface, or outfeed portion, of the blade. Splitter 52 may additionally or alternatively be referred to as a spreader. As schematically illustrated in FIG. 1, splitter 52 and top guard 44 may collectively be referred to as a splitter assembly 50.

Splitter assembly 50, and in some embodiments the entire blade guard assembly 42, may be coupled, typically removably, to the table saw by a mounting mechanism 54. Mounting mechanism 54 supports and positions at least the splitter assembly of the blade guard assembly relative to the blade (or other cutting tool) of the table saw. Mounting mechanism 54 may include any suitable structure and/or may utilize any suitable mechanism to removably secure the splitter assembly to the table saw, such as by securing the splitter to body 12, table 14, or to components of the table saw that are beneath the table. In some embodiments, mounting mechanisms 54 may be located beneath the work surface or table of the table saw, such as within the body, or cabinet, of the table saw.

In some embodiments, the mounting mechanism may removably secure the splitter to the blade adjustment mechanism. In such an embodiment, this may configure the splitter, and in many embodiments the entire blade guard assembly, to move with the blade. By this it is meant that the orientation of at least the splitter assembly of the blade guard assembly relative to the work surface may be changed as the orientation of the blade relative to the work surface is changed. As illustrative examples, the blade adjustment mechanism may cause the blade and at least the splitter assembly, and optionally the entire blade guard assembly, to be raised, lowered, and/or titled relative to the work surface. As used herein, references to tilting of the blade relative to the work surface mean that the angle defined between the work surface and the plane of the blade is selectively increased or decreased, with this angle being 90°, or approximately 90°, when the blade is in an upright position, or upright orientation, relative to the work surface.

In FIG. 1, it is schematically illustrated that blade guard assembly 42 may optionally include at least one anti-kickback mechanism 58. It is within the scope of the present disclosure that the disclosed blade guards and/or blade guard assemblies may be utilized without one or more of the disclosed anti-kickback mechanisms, and vice versa. In some embodiments, the anti-kickback mechanism, when present, is coupled to and/or integrated into the blade guard or splitter. Anti-kickback mechanism 58 is configured to prevent the workpiece, at least after having been cut by the blade, from being propelled toward the user by the spinning blade, typically at a high velocity. Anti-kickback mechanism 58 is typically positioned rearward of the saw's arbor to engage the workpiece, at least in the event that contact with the spinning blade by the workpiece causes the workpiece to begin to be thrust forward and upward toward a user. When present, mechanism 58 may be coupled to one or both of splitter 52 and blade guard 56. Illustrative, non-exclusive examples of suitable anti-kickback mechanisms are disclosed in U.S. Pat. Nos. 4,615,247, 4,418,597, 3,232,326, 2,095,330, and 1,526, 128, and in U.S. Patent Application Publication No. 2005/0166736. Some blade guard assemblies may include two or more anti-kickback mechanisms 58, with such mechanisms having the same or different shapes, mechanisms, and/or configurations. In some embodiments, the anti-kickback mechanisms may be spring-biased anti-kickback mechanisms. Blade guard assemblies 42 according to the present disclosure may include components in addition to at least one lateral guard 46, a splitter, and an optional top guard 44.

Figure 2:
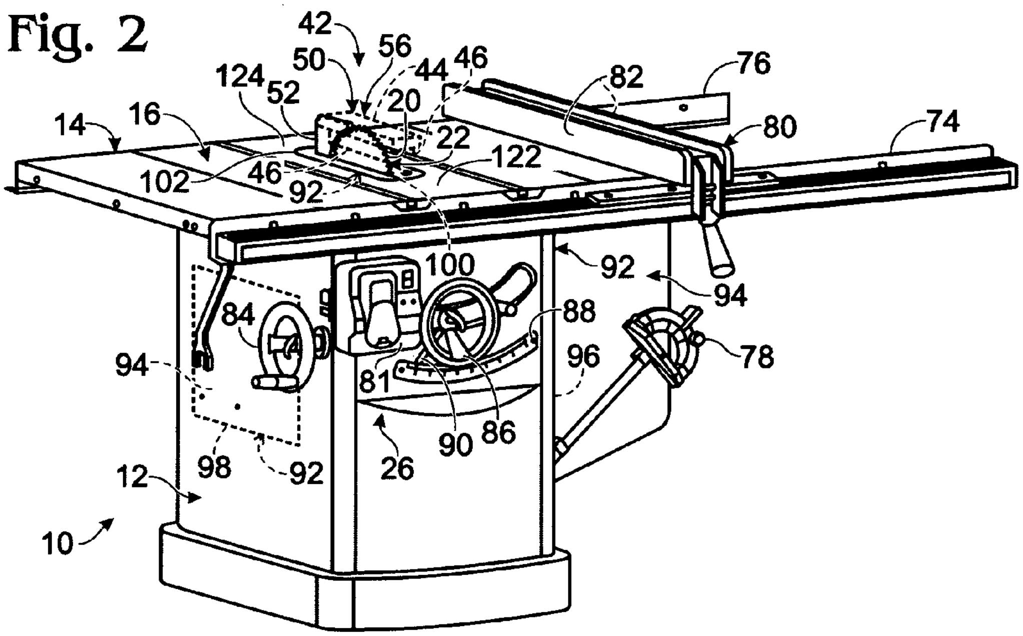
FIG. 2 is an isometric, less schematic view of an illustrative, non-exclusive example of a table saw with a blade guard assembly according to the present disclosure.

In FIG. 2, a less schematic example of a table saw 10 that may include, or be used with, blade guards 56 and blade guard assemblies 42 according to the present disclosure is shown. Illustrative, non-exclusive examples of many of the various components that were schematically represented in FIG. 1 are shown in FIG. 2. In FIG. 2, table saw 10 is shown with a table with a work surface 16 that includes an infeed region 122 and an outfeed region 124. The infeed region refers generally to the portion of the work surface that a workpiece rests upon as the workpiece is moved into contact with the spinning blade (or other cutting tool), and the outfeed region refers generally to the portion of the work surface that the workpiece rests upon after it has been cut by the blade. A cutting tool 20 in the form of a circular blade 22 is shown projecting above the work surface between the infeed and outfeed regions thereof. Blade 22 has an orientation with respect to the work surface and is supported for rotational movement in this orientation relative to the work surface. Also shown is an illustrative, non-exclusive example of blade guard assembly 42. Blade guard assembly 42 includes a splitter 52, such as may form a portion of a splitter assembly 50 according to the present disclosure. As discussed in more detail herein, the splitter assembly includes a blade guard 56, which may be coupled to the splitter and which may form a portion of the splitter assembly. In FIG. 2, blade guard 56 is schematically depicted and includes a pair of lateral guards 46 and a top guard 44. It is within the scope of the present disclosure that a blade guard 42 according to the present disclosure may include one, two, or more lateral guards 46, and/or may not include a top guard.

The illustrative, non-exclusive example of a table saw 10 in FIG. 2 is shown including front and rear rails 74 and 76, a miter gauge 78, and a fence 80, although these components are not required in all embodiments. Fence 80 rests on table 14 and clamps to front rail 74. The fence provides at least one face, or surface, 82 against which a user may slide a workpiece when making a cut. Illustrative, non-exclusive examples of suitable fences are disclosed in U.S. Patent Application Publication No. 2005/0139056.

Table saw 10 may also include a switch box 81 with one or more switches or other user inputs that are selectively actuated to control the operation of the saw. Illustrative, non-exclusive examples of suitable switch boxes that are designed for use with table saws as described herein are described in U.S. Patent Application Publication No. 2005/0139459.

As discussed, the table saw may include a blade adjustment mechanism 26 that is configured to change the orientation of the blade relative to the work surface responsive to user inputs to the blade adjustment mechanism. In some embodiments, the blade adjustment mechanism may be adapted to selectively raise and lower the blade relative to the work surface. The extent to which the blade extends above the table is normally referred to as the elevation of the blade. The blade elevation is normally set to be slightly larger than the thickness of the material to be cut. By way of illustrative, non-exclusive example, if the material to be cut is one inch thick, the blade elevation may be set so that the uppermost edge of the blade may be one and one-quarter inches above the work surface. In some embodiments, the blade adjustment mechanism may be adapted to selectively tilt the blade relative to the work surface (i.e. change the angle of the plane of the blade relative to the plane of the work surface). In many embodiments, the blade adjustment mechanism is adapted to permit user-selected adjustment of both the elevation and tilt, which also may be referred to as the height and angle, of the blade relative to the work surface.

In FIG. 2, hand wheels 84 and 86 are shown. Hand wheels 84 and 86 are illustrative, non-exclusive examples of user inputs that are selectively manipulated by a user to adjust the orientation of the blade relative to the work surface, with wheel 84 conveying user inputs to the blade adjustment mechanism to adjust the vertical position, or height, of the blade relative to the work surface, and wheel 86 conveying user inputs to the blade adjustment mechanism to adjust the angle, or tilt, of the blade relative to the work surface. In the non-exclusive example shown in FIG. 2, an optional gauge 88 and pointer 90 are shown associated with wheel 86 to indicate to a user the selected angle of the blade relative to the work surface. For example, when the blade is tilted 45-degrees relative to the work surface, pointer 90 would point to the 45-degree mark on gauge 88.

The body, or housing, 12 of the table saw may include at least one opening 92 to allow access to the internal components of the saw. The body also may be referred to as the cabinet of the table saw. FIG. 2 shows table saw 10 with three illustrative, non-exclusive openings 92, and associated covers 94. The openings include a motor opening 96, an access panel opening 98, and a work surface opening, or throat, 100. Illustrative covers for each opening are also shown. Some covers, such as the motor cover and access panel cover may be mounted to the housing with hinges or other suitable mechanisms so the covers can pivot away from the opening. In other embodiments, the cover may be selectively secured in and/or over the opening by releasable fastening mechanisms, with the cover being selectively removed from the body of the table saw when it is desirable to access internal components of the table saw through the opening. A throat cover, or throat plate, 102 is an example of such a cover. In the context of defining the surface along which a work surface moves across the table, the throat plate may be described and/or considered to be a portion of the work surface. Table saws 10 according to the present disclosure may include more or less and/or differently positioned or oriented openings and/or covers than the illustrative examples described above and/or shown in the non-exclusive example of a table saw depicted in FIG. 2.

Additional illustrative, non-exclusive examples of components that may be included in and/or used with table saws, blade guards, splitter assemblies and/or blade guard assemblies according to the present disclosure are disclosed in U.S. Patent Application Publication No. 2005/0166736. These illustrative, non-exclusive components include examples of suitable mounting mechanisms and blade adjustment mechanisms, amongst others. Additional illustrative, non-exclusive examples of table saws and components and accessories therefor, including mounting mechanisms and blade adjustment mechanisms, are disclosed in U.S. Patent Application Publication No. 2005/0166736, which is incorporated herein by reference.

Figure 3:
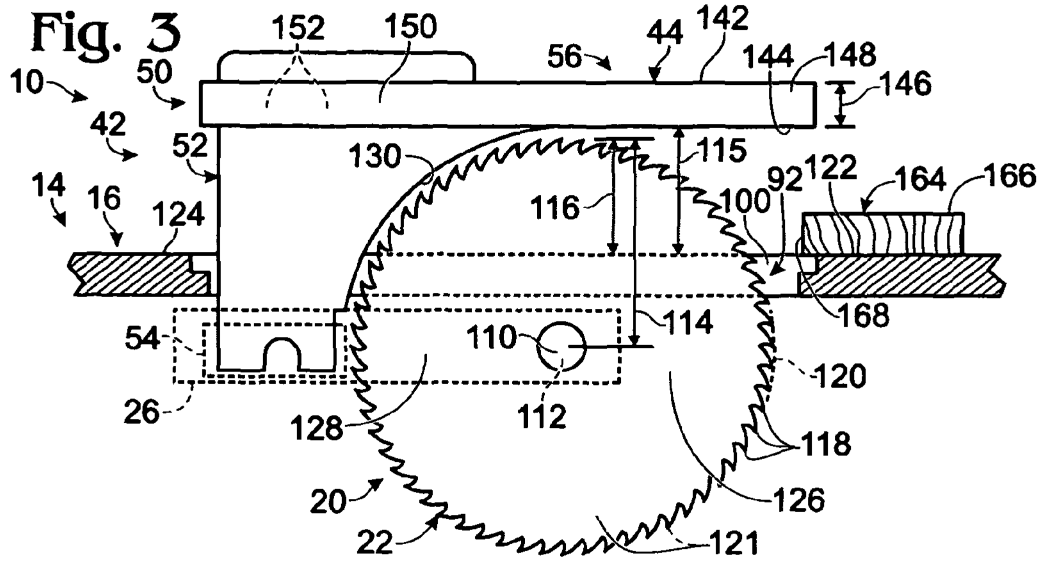
FIG. 3 is a partially schematic, fragmentary side elevation view of a portion of a table saw with a blade guard assembly with a top guard according to the present disclosure.

FIG. 3 illustrates a portion of a table saw 10 with a cutting tool 20 in the form of a blade 22. Table saw 10 includes a table 14 with a work surface 16 having a passage, or opening, 92 in the form of a throat 100 through which a portion of a cutting tool 20 in the form of a (nominally) circular blade 22 extends. Blade 22 includes an aperture 110, through which an arbor 112 of the table saw extends. Rotation of the arbor, and thus blade 22, is driven by the saw's motor assembly. The arbor is suitably coupled to the saw's blade adjustment mechanism 26 such that the relative orientation (such as the height and/or angle) of the arbor, and thus the blade, relative to the work surface 16 of the saw's table 14 may be selectively adjusted by a user. The blade adjustment mechanism is schematically illustrated in FIG. 3. As discussed, and as is also schematically illustrated in FIG. 3, the mounting mechanism for a splitter assembly 50 and/or blade guard assembly 42 may also be coupled to the blade adjustment mechanism so that at least the splitter assembly's orientation relative to the work surface changes as the orientation of the blade and arbor changes.

In the illustrative, non-exclusive example shown in FIG. 3, blade 22 has a radius 114 and extends above work surface 16 by a distance 116, which also may be referred to as the elevation of the blade. This distance, or elevation, will typically have a maximum value that is less than 80% of the radius of the blade, and may be reduced to zero, or even a negative distance as the blade is lowered relative to the work surface by blade adjustment mechanism 26. The illustrated blade includes a plurality of teeth 118 that are sequentially arranged around the perimeter, or perimetrical edge, 120 of the blade. The number and configuration of the teeth may vary, as some blades have different numbers and/or types of teeth, such as for use with particular types of workpieces, particular types of cutting operations, particular performance criteria, etc. Some blades do not include teeth. Some cutting tools include more than one blade, such as in the case of a dado blade that includes a plurality of generally parallel blades. As illustrated in FIG. 3, a generally planar face 121 of the blade is shown, with it being understood that the blade includes another face 121 on the opposed side of the blade.

As illustrated in FIG. 3, work surface 16 may be described as having an infeed region 122 and an outfeed region 124. The infeed region of the work surface includes the portion of the work surface upon which a workpiece is supported prior to the workpiece being moved into engagement with the spinning blade to cut the workpiece with the blade, and the outfeed region of the work piece includes the portion of the work surface upon which the work piece is supported after the workpiece has been cut by the blade. Blade 22 may accordingly be described as having an infeed portion 126 and an outfeed portion 128, with these portions generally referring to regions of the blade that, at any given time, respectively are oriented toward, or face, the infeed and outfeed regions of the work surface. In FIG. 3, a workpiece 164 is shown positioned on infeed region 122 of the work surface, with the workpiece including a top surface 166 and a leading edge 168.

As discussed, blade guard assembly 42 includes a splitter 52 that is positioned adjacent the outfeed portion of the blade, such as by a mounting mechanism 54, which is schematically illustrated in FIG. 3. The mounting mechanism may additionally or alternatively be described as being configured to position the splitter adjacent to the blade distal the infeed portion of the blade and/or distal the infeed region of the work surface. As illustrated, the splitter includes a leading edge 130 that is positioned near, but spaced-apart from, the perimetrical edge of the blade. In this configuration, the spinning blade does not contact the splitter, but the cut portions of the workpiece will contact the splitter before engaging the teeth in the outfeed portion of the blade in a manner that may cause kickback of the workpiece if some portion of the workpiece is urged laterally toward the teeth in the outfeed portion of the blade. Although it is not required, the splitter will often be configured to travel up and down as the elevation of the blade is adjusted to maintain the same, or at least approximately, the same proximity to the outfeed portion of the blade independent of the elevation of the blade.

Figure 4:
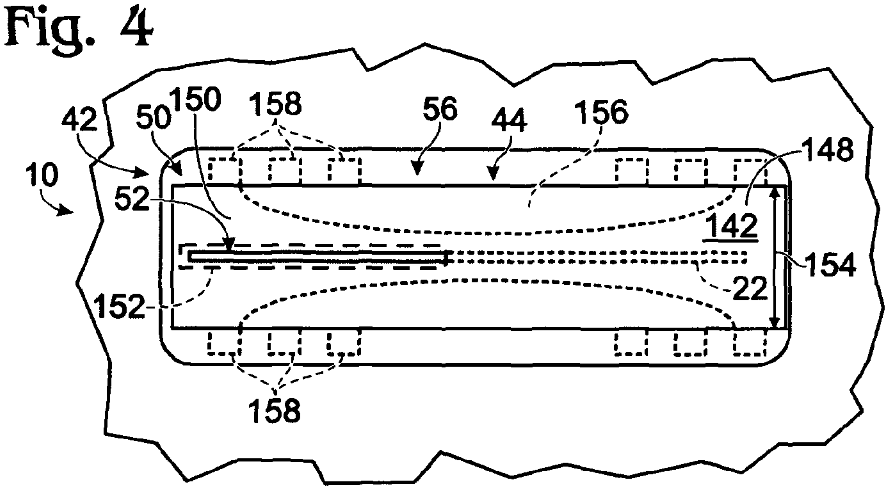
FIG. 4 is a top plan view of portions of a table saw with a blade guard assembly with a top guard according to the present disclosure.
Figure 5:
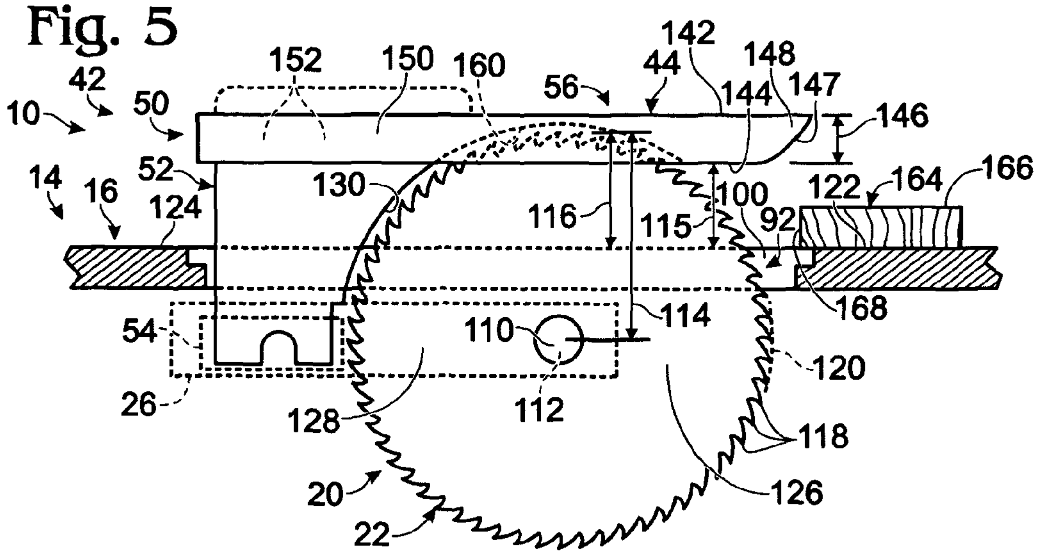
FIG. 5 is a partially schematic, fragmentary side elevation view of a portion of a table saw with another blade guard assembly with a top guard according to the present disclosure.

In FIG. 3, splitter 52 is indicated as forming a portion of a splitter assembly 50 that may also include a top guard 44 that extends from the splitter generally toward the infeed region of the work surface. By this it is meant that the top guard extends at least over the upper surface of the saw blade, and thereby extends from the splitter toward the infeed region of the work surface. The height and angle of the top guard relative to the infeed and/or outfeed region of the work surface may vary within the scope of the present disclosure, as discussed in more detail herein. As discussed, it is within the scope of the present disclosure that a blade guard assembly according to the present disclosure may or may not include a top guard. Nonetheless, FIGS. 3-5 illustrate various illustrative, non-exclusive examples of top guards that may, but are not required to, be included in blade guard assemblies 42 according to the present disclosure. In FIGS. 3-5, the at least one lateral guard that will form a portion of a blade guard assembly according to the present disclosure is not shown. Such a lateral guard, or guards, may be coupled to a suitable portion of the splitter, top guard, and/or splitter assembly for selective positioning responsive to engagement with a workpiece, as described and illustrated in more detail herein.

As illustrated in FIG. 3, top guard 44 extends over at least a portion, if not all, of the upper surface of the saw blade. Additionally or alternatively, the top guard may be described as extending over some portion of the blade that projects above the work surface. The top guard has a thickness 146 measured between its top and bottom regions, or extents, which in the illustrated, non-exclusive example, take the form of upper and lower surfaces 142 and 144. Other constructions may be utilized, such as top guards that include one or more rods, wireforms, trusses, frameworks, or the like. Accordingly, the upper and lower surface of the top guard may respectively refer to a physical surface of the top guard or to a projection defined across spaced-apart upper or lower regions of the top guard. Accordingly, the top guard may additionally or alternatively be described as having a vertical dimension, which may correspond to the thickness of the top guard. As illustrated in FIG. 3, the top guard has a uniform thickness along its length, but this is not required to all embodiments.

Splitter 52 will typically be formed from metal, but this is not required. Top guard 44 may be formed from any suitable material, or combinations of materials, and may be formed from a single component, or a series of interconnected components. Illustrative, non-exclusive examples of suitable materials include metals, plastics, curable polymers, and the like. In some embodiments, at least one (if not both) of the infeed guard portion and the outfeed guard portion may be formed as a monolithic structure and/or from a single material. In some embodiments, the top guard may be formed from two or more different materials. In some embodiments, the top guard may be at least partially, if not substantially or even completely, formed from a transparent material that permits a user to see the blade (and the adjacent region of the work surface and any workpiece being cut) through the top guard. An illustrative example of such a material is polycarbonate, but others may be used.

The top guard includes an infeed guard portion 148 and an outfeed guard portion 150. The outfeed guard portion is typically coupled to the splitter and extends therefrom to or toward the infeed guard portion. The outfeed guard portion may be coupled to the splitter by any suitable type and number of fastening mechanisms 152. Illustrative, non-exclusive examples of suitable fastening mechanisms include permanent fastening mechanisms and reusable fastening mechanisms. Permanent fastening mechanisms are fastening mechanisms that secure the outfeed guard portion to the splitter such that the outfeed guard portion may not be separated from the splitter without damaging or destroying at least a portion of the infeed guard portion, the splitter, and/or the fastening mechanism. Illustrative, non-exclusive examples of permanent fastening mechanisms include welds, adhesive and/or chemical bonds, and cured or molded interconnections between the splitter and the outfeed guard portion. Reusable fastening mechanisms are fastening mechanisms that are constructed to permit user-selected removal of the top guard from the splitter, and reattachment of the top guard thereto, without destruction or damage to the top guard, the splitter, and/or the fastening mechanism. Illustrative, non-exclusive examples of reusable fastening mechanisms include threaded fasteners, such as screws and bolts, and corresponding threaded sockets or nuts, clamps, pins, and the like. Reusable fastening mechanisms may additionally or alternatively be referred to as releasable fastening mechanisms. At least reusable fastening mechanisms may optionally include a handle, user-grippable region, or other portion or mechanism to assist a user in removing the fastening mechanism without requiring the use of tools.

When the top guard is coupled to the splitter with a reusable fastening mechanism, at least one of the top guard, the splitter, and the fastening mechanism may be configured to permit selective positioning and securement of the top guard relative to the splitter within a range of, or in a selected one of a plurality of, top guard positions in which the top guard still extends over the top of the blade to protect a user during use of the table saw to cut a workpiece. As an illustrative, non-exclusive example, the lateral position of the top guard relative to the splitter may be adjustable within a range of positions. Such a construction may be useful when it is desirable to reduce the lateral projection of the top guard relative to a face of the blade and/or to increase the lateral projection of the top guard relative to the other face of the blade. As another illustrative, non-exclusive example, the longitudinal position of the top guard relative to the splitter may be selectively adjustable, such as to accommodate user-selection of the distance that the infeed guard portion extends away from the infeed portion of the blade. As still another illustrative, non-exclusive example, the use of reusable fastening mechanisms may permit selective interchanging of two or more top guards, such as to accommodate different blades or cutting tools, different user preferences, different workpieces, and/or different cuts. A splitter assembly with two or more interchangeable top guards may be referred to herein as a splitter assembly kit, and a blade guard assembly with two or more interchangeable top (or other) guards may be referred to herein as a blade guard assembly kit.

FIG. 4 is a top plan view of the splitter assembly and portion of the table saw of FIG. 3. As shown, the top guard has a width 154, which is measured perpendicular to the plane of the saw blade. The width of the top guard typically will be thicker than the width, or face-to-face thickness, of the saw blade, with illustrative, non-exclusive examples including widths that are at least 1.5, 2, 5, 10, 25, 50, or more times the width of the saw blade. In FIG. 4, the top guard is illustrated as having a constant width, but it is within the scope of the present disclosure that the width of the top guard may vary within the scope of the present disclosure. As illustrative, non-exclusive examples, the top guard may be tapered in width from the infeed guard portion to the outfeed guard portion, or vice versa. As another illustrative, non-exclusive example, and as illustrated in dashed lines in FIG. 4, the central region of the top guard may have a reduced width compared to distally spaced infeed and outfeed guard portions. In such a construction, the top guard may be described as having a reduced-width central region 156 generally between the infeed and outfeed guard portions. As yet another illustrative, non-exclusive example, and as illustrated in dashed lines in FIG. 4, the top guard may include one or more projecting regions 158 that extend from one or both lateral sides, or lateral edges, of the top guard. It is also within the scope of the present disclosure that the top guard may include one or more apertures and/or channels or slots that extend into and/or through the top guard.

In FIG. 3, the lower surface 144 of the top guard is shown extending above the work surface by a height 115 that is greater than the distance 116 that the blade extends above the work surface. This construction is not required in all embodiments. In some embodiments of blade guard assemblies 42 that include a top guard, the splitter assembly may be constructed so that the lower surface of the top guard extends closer to the work surface of the table saw than the distance 116 that the blade extends above the work surface. An illustrative, non-exclusive example of such a top guard is shown in FIG. 5. In FIG. 5, many of the previously described components and/or elements of FIG. 3 are illustrated, but for the sake of brevity, will not be discussed again in the context of FIG. 5. In FIG. 5, the upper portion of splitter 52 is shown in dashed lines to graphically indicate that the splitter may or may not extend above the upper surface of the top guard without departing from the scope of the present disclosure.

Figure 6:
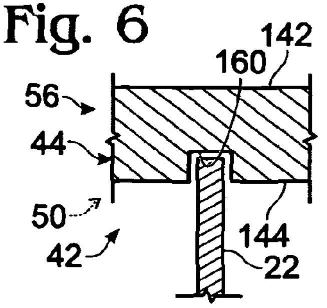
FIG. 6 is a fragmentary cross-sectional view of an illustrative, non-exclusive example of a top guard that may be used with a blade guard assembly with a top guard according to the present disclosure.
Figure 7:
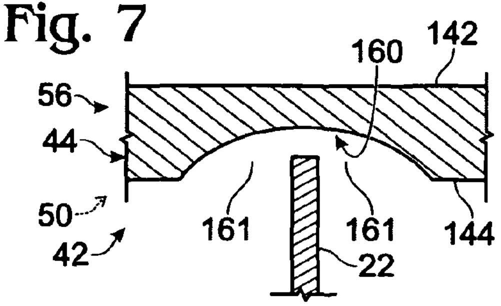
FIG. 7 is a fragmentary cross-sectional view of another illustrative, non-exclusive example of a top guard that may be used with a blade guard assembly according to the present disclosure.

In the illustrative, non-exclusive example of a top guard shown in FIG. 5, the top guard includes a recess, or channel, 160 into which a portion of the blade extends, at least when the blade extends above the work surface of the table saw. In such an embodiment, the blade may be described as extending into the top guard. Additionally, or alternatively, the top guard may be described as having a lower surface from which a channel or recess extends into the body of the top guard, such as generally toward the upper surface of the top guard, with at least a portion of the cutting surface of the blade extending into this recess or channel. Illustrative, non-exclusive examples of suitable configurations for channel 160 are shown in FIGS. 6 and 7. In FIG. 6, channel 160 has a slot-like, or elongate groove, configuration that closely conforms to the width of the blade. While not required, it is within the scope of the present disclosure that the channel may be cut into the body of the top guard (i.e., the region of the top guard between its upper and lower surfaces) by the blade. Other methods may be used to form the channel in the top guard, including doing so when the top guard is formed. In FIG. 7, the channel has a dome-like, or arched, configuration in which the channel defines open passages 161 on each side of the portion of the blade that is received within the channel, with such passages extending laterally from each of the sides of the portion of the blade a distance that exceeds thickness of the blade, and which may be twice, three times, or more than the thickness of the blade. In contrast, in FIG. 6 the channel may have a width that is not appreciably wider than the thickness of the portion of the blade that is received into the channel, such as a width that is less than twice the thickness of the portion of the blade, although larger and smaller widths remain within the scope of the present disclosure.

In some such embodiments, the lower surface of the top guard in at least one of the infeed guard portion and the outfeed guard portion may have a generally planar construction and the top guard may have a thickness that is less than 25%, or even less than 15%, of the radius of the blade. Neither of these features is required to all embodiments. Positioning the lower surface of the top guard closer to the work surface results in the top guard not projecting above the work surface as much, or as far, as a similarly constructed top guard in which the blade does not extend into the top guard. Accordingly, some users may find that such a top guard is less obtrusive and/or does not obstruct the user's view of the blade as much as a higher-positioned top guard. Furthermore, the lower surface of the top guard, when positioned below the top of the blade, can serve as a hold down to prevent the workpiece from lifting up and possibly causing kickback. Where the lower surface of the top guard is positioned below the top of the blade, the infeed end of the top guard will typically include an entry ramp 147. Ramp 147 reduces the chance of the workpiece catching on the infeed end of the top guard as the workpiece is slid into the blade. Other users may prefer having additional clearance between the lower surface of the top guard and the work surface. Both constructions are within the scope of the present disclosure.

As discussed, splitter assemblies according to the present disclosure may be configured to move (i.e., change their vertical and/or angular configuration with respect to the work surface) with the blade, such as responsive to user inputs to the table saw's blade adjustment mechanism. Accordingly, a top guard that is configured to move as a unit with the blade may be supported, or secured, a fixed distance above the axis of the arbor of the saw, with this distance being less than the radius of the blade. This fixed distance, if implemented in a particular embodiment of a table saw according to the present disclosure still permits use of the saw to cut workpieces with a variety of thicknesses, as the distance the blade extends above the work surface may be adjusted by a user to accommodate the thickness of the workpiece beneath the top guard.

In FIG. 5, the lower surface 144 of the top guard is shown positioned slightly above the upper surface 164 of a workpiece 166, with workpiece 166 also illustrated as having a leading edge 168. As discussed herein, this distance may vary within the scope of the present disclosure, such as to include distances that are more or less than the illustrated non-exclusive example. In some embodiments, at least a portion, or even all, of the lower surface of the top guard may engage the upper surface of the workpiece. In some embodiments, only a region of the lower surface in the infeed guard portion of the top guard contacts the upper surface of the workpiece. In some embodiments, the lower surface of the top guard does not engage the workpiece (or may be selectively positioned by a user to not engage the workpiece) when the table saw is used to cut a workpiece with the top guard operatively positioned above the blade.

Regardless of the height of the top guard relative to the blade of the table saw, top guards 44 according to the present disclosure may be (but are not required to be) configured to limit the upward movement, or deflection, away from the work surface of a workpiece being cut by the saw. Limiting the upward movement of the workpiece away from the work surface may reduce or even prevent kickback of the workpiece being cut by the saw. For example, by preventing the workpiece from lifting off of the work surface, the top guard may prevent the kickback force that can be created when the workpiece drops back down onto the blade, or at least the front portion thereof. Similarly, by acting as a hold down on the workpiece, the top guard can prevent the lifting action by the teeth at the back of the blade from lifting the workpiece and causing kickback, and which might otherwise propel the workpiece upward and toward a user. As used herein, "upward," when used in the context of movement of the blade and/or movement of a workpiece relative to the work surface of a table saw, refers to movement generally perpendicular to the plane of the work surface and generally away from the base of the saw.

The illustrative top guards shown in FIGS. 3 and 5 may both be configured to be top guards that are configured to limit the upward movement of the workpiece away from the work surface. Perhaps more specifically, the top guard may be secured to the splitter in a suitable manner to provide this positive limitation to the upward movement of the workpiece. For example, the outfeed guard portion of the top guard may be secured to the splitter in a fixed orientation and/or in an orientation in which the infeed guard portion is not freely pivotal away from the work surface relative to the splitter. Because the outfeed guard portion of the top guard is secured to the splitter such that the infeed guard portion may not freely pivot away from the work surface, vertical movement of the workpiece away from the work surface is restricted when the workpiece engages the top guard. This is distinguishable from top guards that are pivotally coupled to the splitter and which may pivot away from the work surface of the table responsive to forces applied thereto, such as to the underside of the top guard. These forces may need to be sufficient to overcome the weight of the top guard to pivot the top guard away from the work surface, but otherwise such a top guard that is not a hold-down guard is not secured, biased, or otherwise configured to positively retain or limit the upward movement of a workpiece away from the work surface of the table.

The illustrative examples shown in FIGS. 3 and 5 demonstrate that the vertical distance that a workpiece is permitted to move away from the work surface may vary before it is engaged by the top guard to limit further vertical movement of the workpiece. However, both illustrated examples may still positively limit the vertical movement of the workpiece and thus will prevent the workpiece from being thrust upwardly and toward a user should kickback occur.

In some embodiments, the top guard may be configured not only to limit the upward deflection of the workpiece above the work surface, but also to positively retain the workpiece against the work surface. By "positively retain," it is meant that the top guard not only engages the workpiece at least as the workpiece is being cut by the saw, but also that the top guard urges, or restrains, the workpiece against the work surface with more than merely the weight of the top guard and any components attached thereto. Accordingly, a top guard that positively retains the workpiece against the work surface may be biased by a biasing mechanism of the saw to urge the workpiece against the work surface. Top guards that engage the workpiece to positively retain the workpiece against the work surface may provide additional stability and/or support to the workpiece relative to the work surface and blade of the saw.

It is within the scope of the present disclosure that a top guard that is configured to limit the upward deflection of the workpiece above the work surface may or may not engage the workpiece when the workpiece is being cut by the saw. However, such a top guard will still engage the workpiece to limit upward movement of the workpiece away from the work surface. Top guards that limit the upward movement of workpieces and top guards that positively retain the workpiece against the work surface of the saw may collectively be referred to herein as hold-down guards, even though the former example may or may not contact the workpiece until the work piece is elevated above the work surface.

The degree to which and/or force with which the top guard contacts and/or retains the workpiece against the work surface may vary within the scope of the present disclosure. For example, the top guard may initially permit a predetermined amount of elevation of the work surface, and optionally a predetermined amount of deflection or upward movement of at least the engaged portion of the top guard, and thereafter restrict further deflection or movement away from the work surface. In some embodiments, this initial range of permitted deflection of the top guard and/or elevation of the workpiece away from the work surface may be helpful, such as to accommodate variations in the workpiece thickness when the top guard is configured as a hold-down guard that contacts the workpiece as the workpiece is moved across the work surface to be cut by the saw. When it is desirable to positively retain the workpiece against the work surface, the intentional movement of the workpiece from the infeed region to the outfeed region of the work surface by a user should not be obstructed or interfered with by the top guard. Similarly, such a top guard should also accommodate slight variations in the workpiece thickness without binding or otherwise restricting further movement of the workpiece from the infeed region of the work surface toward the spinning blade.

Some hold-down guards according to the present disclosure may be configured to apply a force to urge the workpiece against the work surface of the table. Hold-down top guards that are biased toward the work surface are illustrative, non-exclusive examples of such guards. In some embodiments, this force may be selected to be sufficient to resist elevation of the workpiece from the work surface by the blade during normal cutting of the workpiece by the blade (i.e., when kickback has not occurred). In some embodiments, this force may be selected to resist elevation of the workpiece from the work surface when kickback occurs and attempts to thrust the workpiece upward and away from the blade. This biasing force is independent from the mere weight of the top guard, which may or may not urge the workpiece against the work surface. Illustrative, non-exclusive examples of the force applied by a hold-down guard that is configured to positively retain the workpiece against the work surface of the table include at least 1 pound of force, at least 5 pounds, at least 10 pounds, at least 25 pounds, at least 50 pounds, 1-20 pounds, 5-30 pounds, 10-50 pounds, 25-75 pounds, etc. This applied force may be selected to provide the desired retaining force while also not preventing a user from sliding a workpiece along the work surface from a position on the infeed region where the workpiece is spaced-apart from the top guard, to a position in which the workpiece extends at least partially beneath the top guard, and to a position in which the workpiece is being cut by the blade.

Additionally or alternatively, some top guards 44 according to the present disclosure may be configured to prevent upward movement of the workpiece away from the blade, either at all, or by more than a predetermined distance. As discussed herein, some examples of this latter type of hold-down guards are configured to permit an initial amount of movement of the workpiece away from the work surface of the table, but thereafter prevent further movement of the workpiece away from the work surface, such as to prevent kickback from thrusting the workpiece toward a user. Such hold-down top guards may be constructed to resist a predetermined amount of force being imparted thereto by the workpiece, such as if the workpiece is thrust generally upward and otherwise away from the blade and into contact with the top guard during kickback. By this it is meant that a workpiece that is thrust into contact with the lower surface of the top guard with a force up to such a predetermined amount of force will not cause the top guard to deflect or otherwise move away from the work surface, either at all or to a degree to permit the workpiece to be thrust upward and away from the blade more than the predetermined amount. Illustrative, non-exclusive examples of this predetermined amount of force that may be applied by a workpiece against the lower surface of the top guard without causing the top guard to fail, break, or otherwise cease to be a hold-down guard include forces of at least 10 pounds, 50 pounds, 100 pounds, 200 pounds, 500 pounds, 10-100 pounds, 25-150 pounds, 50-250 pounds, 75-325 pounds, 100-200 pounds, 150-400 pounds, etc.

Additional illustrative, non-exclusive examples of blade guards, top guards, and splitter assemblies that may be used with and/or incorporated into blade guard assemblies according to the present disclosure are disclosed in U.S. patent application Ser. No. 11/906,430, which is incorporated herein by reference.

Figure 8:
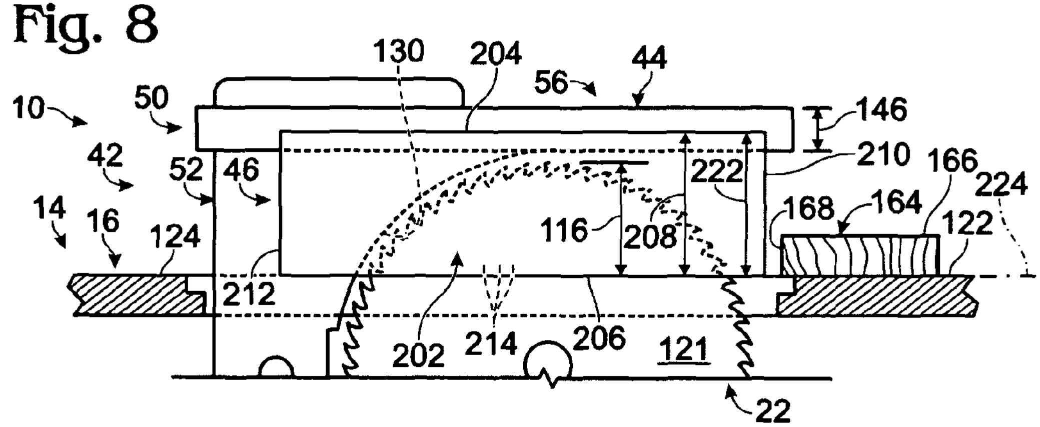
FIG. 8 is a partially schematic side elevation view of a portion of a table saw with a blade guard assembly that includes a lateral guard according to the present disclosure.
Figure 9:
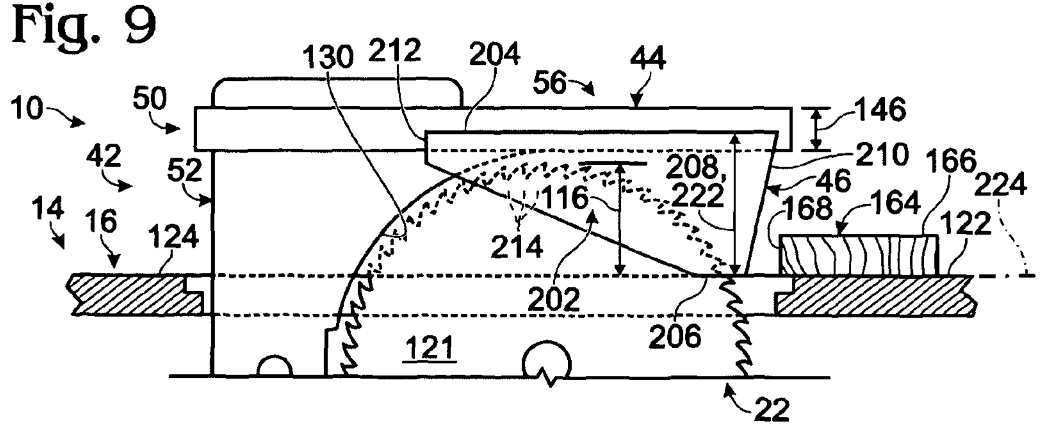
FIG. 9 is a partially schematic side elevation view of a portion of a table saw with a blade guard assembly that includes another lateral guard according to the present disclosure.

Illustrative, non-exclusive examples of a blade guard assembly 42 according to the present disclosure are schematically illustrated in FIGS. 8 and 9. As shown, blade guard assembly 42 includes a blade guard 56 with a lateral guard 46 that is coupled to a splitter assembly 50 for movement relative to the splitter assembly. For the purpose of simplicity, the following discussion refers to a single lateral guard 46 and to a splitter assembly that includes a splitter 52 and a top guard 44. However, it is within the scope of the present disclosure, and is typically the case, that the blade guard assembly may include a pair of lateral guards, such as a pair of lateral guards that are spaced apart * relative to opposed faces of the saw blade, that the lateral guards may be configured for independent or collective movement relative to the splitter assembly, and that the splitter assembly may not include a top guard. When a blade guard assembly includes a pair of lateral guards, the pair of lateral guards may be referred to as a lateral guard assembly.

As somewhat schematically illustrated in FIGS. 8 and 9, lateral guard 46 extends proximate to a lateral face 121 of the blade, such as by extending generally parallel to the face and/or otherwise laterally spaced relative to the face of the blade to obstruct an individual from touching the face of the blade. The relative distance between a lateral guard and the face of the saw blade may vary without departing from the scope of the present disclosure. In some embodiments, it may be desirable to have the lateral guard positioned near (but not touching) the face of the blade, whereas in other embodiments, it may be desirable to have more distance between the lateral guard and the face of the saw blade. Lateral guard 46 has a perimetrical area 202, which refers to the area circumscribed, or bounded, by the lateral guard, as measured from the outer edges of the lateral guard. By this it is meant that a solid rectangular lateral guard would have the same perimetrical area as an open rectilinear frame lateral guard having the same length and width as the solid rectangular lateral guard. Perimetrical area 202 may also be referred to as the lateral perimetrical area of the lateral guard.

Lateral guard 46 includes a top portion 204 and a bottom portion 206, with the respective top and bottom portions respectively referring to the regions of the lateral guard that extend farthest and closest to the work surface at any given time. The distance between the top and bottom portions of the lateral guard may be referred to as a vertical guard distance, as indicated at 208 in FIGS. 8 and 9. As indicated, this distance is measured normal, or perpendicular, to the work surface and thus typically extends in a vertical direction. Vertical guard distance 208 may additionally or alternatively be referred to as a vertical guard dimension.

Lateral guard 46 further includes an infeed region 210 that is adapted to be the first portion of the lateral guard that is engaged by a workpiece or otherwise caused to be displaced as the workpiece is moved along the work surface from the infeed region of the work surface to the blade. As used herein, references to the lateral guard being engaged by the workpiece to move the lateral guard between its operative positions may include direct and/or indirect engagement of the lateral guard by movement of the workpiece on the work surface. For example, infeed region 210 may be directly engaged by the workpiece, such as by a leading edge 168 of the workpiece. Additionally or alternatively, the infeed region may be indirectly engaged by the workpiece, such as by a portion of the blade guard assembly that is contacted by the workpiece such that this contact causes relative responsive movement of at least the infeed region of the lateral guard. Illustrative, non-exclusive examples of such portions of the workpiece that cause this "indirect" engagement of the lateral guard include a lift mechanism that conveys the forces exerted upon the blade guard assembly by the workpiece to forces that are exerted upon the lateral guard, such as to elevate or otherwise move the lateral guard generally away from the work surface, and a nose guard, or front guard, that nominally extends in front of the leading edge of the blade in the path of the workpiece and which is initially engaged by the workpiece as the workpiece is moved on the work surface toward the blade.

Infeed region 210 of lateral guard 46 will typically, although not necessarily, extend farther away from the outfeed region 124 of the work surface than the blade, thereby providing additional of lateral protection, or shielding, of the blade. Lateral guard 46 also includes an outfeed region 212 that faces generally away from the infeed region of the lateral guard, such as by extending proximate the splitter. In some embodiments, the outfeed region of the lateral guard will extend partially or completely forward of the leading edge 130 of the splitter, in some embodiments, the outfeed region of the lateral guard will at least partially overlap with the splitter (when viewed from a lateral direction), and in some embodiments, at least a portion of the outfeed region of the lateral guard may even extend rearwardly beyond the splitter.

In the schematically illustrated, non-exclusive embodiment shown in FIG. 8, the lateral guard extends forward and rearward of the blade, but this is not required for all embodiments. In some embodiments, the lateral guard will extend adjacent to the infeed region of the face of the blade and/or forward of the infeed region of the blade, but not extend adjacent to some or all of the outfeed region of the face of the blade. In some embodiments, the lateral guard will extend adjacent to at least a portion of the face of the blade from the tip of the splitter to the forward extent of the infeed region of the blade. FIG. 9 provides a schematic, non-exclusive example of such a lateral guard 42.

As discussed herein, some lateral guards 46 according to the present disclosure may have a solid, surface-like appearance or construction, whereas other lateral guards according to the present disclosure may have one or more openings or passages extending therethrough. Openings are schematically illustrated in FIGS. 8 and 9 at 214, and the actual number of openings, when present, may vary from a single opening, to two openings, to at least five openings, at least ten openings, etc. When the lateral guard includes one or more openings, the openings may be sized so that a user's finger may not pass through the openings to contact the blade and/or to contact the teeth or other cutting region of the blade. As an illustrative, non-exclusive example, the openings, if present, may be sized so that a cylinder having a 0.375 inch, 0.4 inch, or 0.5 inch diameter may not pass therethrough.

Figure 10:
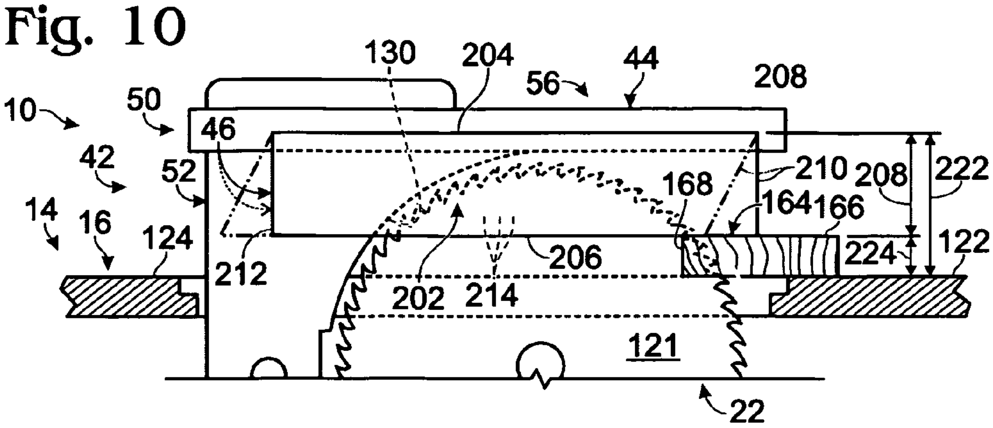
FIG. 10 is a partially schematic side elevation view of a portion of a table saw with a blade guard assembly that includes a lateral guard according to the present disclosure.
Figure 11:
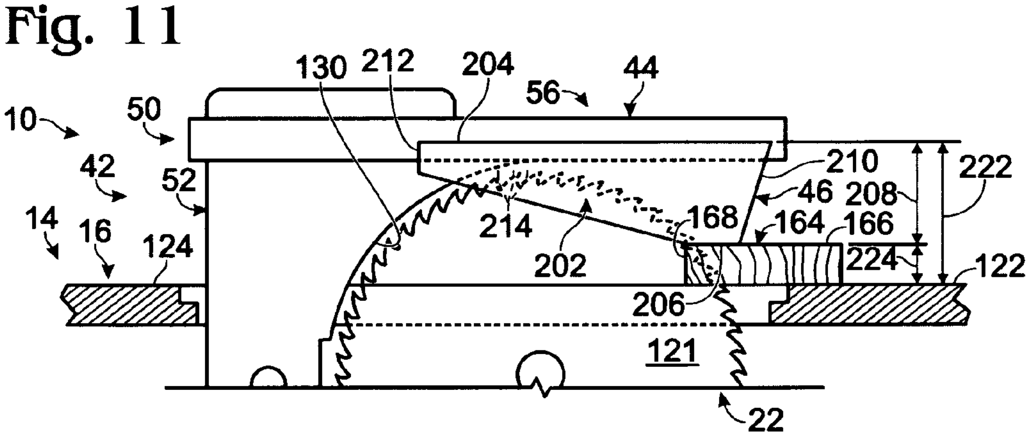
FIG. 11 is a partially schematic side elevation view of a portion of a table saw with a blade guard assembly that includes a lateral guard according to the present disclosure.

Lateral guards 46 according to the present disclosure, including the lateral guards that have been schematically illustrated in FIGS. 8 and 9, are adapted to be selectively configured within a range of operative positions as a workpiece on the work surface of the saw is moved into contact with the lateral guard (or other portion of the blade guard assembly) and with the spinning blade. This range of operative positions includes a non-cutting position and a plurality of cutting positions. The non-cutting position relates to the position of the lateral guard relative to the splitter when the lateral guard is positioned to be engaged by a workpiece on the infeed region of the work surface but when the lateral guard is not engaged by a workpiece on the infeed region of the work surface. The range, or plurality, of cutting positions relate to a position in which the lateral guard is engaged by a workpiece on the work surface and in which the lateral guard is displaced from the non-cutting position by this engagement. The cutting positions include a maximum cutting position, in which the lateral guard is positioned farther away from the non-cutting position than in the rest of the plurality of cutting positions. In FIGS. 8 and 9, lateral guards 46 are schematically illustrated in a non-cutting position. In FIGS. 10 and 11, lateral guards 46 are schematically illustrated in a cutting position.

The top and bottom portions of the lateral guard both move relative to the splitter assembly when the lateral guard is moved from its non-cutting position to a cutting position within the range of cutting positions. In some embodiments, the top portion of the lateral guard may be configured to maintain its angular orientation relative to the work surface as the lateral guard is moved from its non-cutting position to a cutting position, and in some embodiments the top portion of the lateral guard may be configured to maintain its vertical position relative to the work surface as the lateral guard is moved from its non-cutting position to a cutting position. This is not required to all embodiments. In some embodiments, the bottom portion of the lateral guard may be configured to maintain its angular orientation relative to the work surface as the lateral guard is moved from its non-cutting position to a cutting position. This too is not required to all embodiments.

When a lateral guard 46 according to the present disclosure is moved from its non-cutting position to a cutting position, such as the maximum cutting position or another of the plurality of cutting positions, the lateral guard portion may change its orientation relative to the top guard, splitter, and/or splitter assembly. For example, the lateral guard may pivot or translate relative to one or more of the top guard, splitter, and/or splitter assembly. Furthermore, the top portion and the bottom portion of the lateral guard may not exhibit the same, or the same degree, of movement relative to one or more of the top guard, splitter, and/or splitter assembly. In some embodiments, the lateral guard may at least partially collapse, retract, or otherwise move, such as in a vertical direction or dimension, so that the lateral guard has a smaller profile and/or perimetrical area (202) than when in its non-cutting configuration.

In some embodiments, the perimetrical area of the lateral guard, when the lateral guard is in its maximum cutting position, may be less than 75% of the perimetrical area of the lateral guard when the lateral guard is in the non-cutting position. In some embodiments, the perimetrical area of the lateral guard when the lateral guard is in the maximum cutting position may be less than 50%, less than 40%, or even less than 25% of the perimetrical area of the lateral guard when the lateral guard is in the non-cutting position. In some embodiments, the perimetrical area of the lateral guard may be larger than a corresponding lateral perimetrical area of the top guard (when the splitter assembly includes a top guard) when the lateral guard is in its non-cutting position, but equal to, approximately equal to, or smaller than the corresponding top guard perimetrical area when the lateral guard is in a cutting position, such as the maximum cutting position. With this arrangement, the lateral guards effectively collapse to within substantially the perimetrical area of the top guards when at the maximum cutting depth, whereby they have minimal visual or mechanical interference during the cutting operation.

The distance between the top and bottom portions of the lateral guard and the work surface of a corresponding table saw may be referred to as guard-to-table distances 222 and 224, respectively. The guard-to-table distance 224 between the bottom portion of the lateral guard may (but is not required to) be zero or essentially zero when the lateral guard is in its non-cutting position. In other words, the bottom portion of the lateral guard may (but is not required to) nominally contact the work surface of the saw when the lateral guard is in its non-cutting position. By nominally contact the work surface, it is meant that there is not sufficient room for a finger to pass underneath the lateral guard to contact the teeth of the blade, typically requiring a gap of 0.5 inches or less. In some embodiments, guard-to-table distance 222 and vertical guard distance 208 may be the same, at least when the lateral guard is in the non-cutting position. In FIGS. 8 and 9, guard-to-table distance 224 is schematically illustrated to be zero. In FIGS. 10 and 11, guard-to-table distances 222 and 224 are indicated, as are a respective vertical guard distance 208, when the lateral guards are in a cutting position.

In some embodiments, the top portion of the lateral guard defines a guard-to-table distance 222 that increases less than any increase in a guard-to-table distance 224 between the bottom portion of the lateral guard and the work surface when the lateral guard is moved from the non-cutting position to a cutting position. In some embodiments, the lateral guard may be configured such that the vertical lateral guard distance is less in the plurality of cutting positions than in the non-cutting position. As illustrative, non-exclusive examples, in some embodiments, the vertical guard distance (as measured normal to the plane of the work surface) may be less than 60%, less than 50%, or even less than 40% of the maximum distance that the blade projects, or may project, above the work surface.

When lateral guards 46 according to the present disclosure are coupled to a splitter assembly that includes a top guard, the lateral guards may be configured for relative movement with respect to the splitter, the top guard, or both, and the lateral guard may be coupled to the splitter, the top guard, or both. In some embodiments, a lateral guard may extend laterally beyond a lateral edge of the top guard, such as by the lateral guard being coupled to the lateral edge of the top guard and/or extending in contact with the lateral edge of the top guard. In some embodiments, the top guard may include a lateral guard recess, or channel, from which the lateral guard may project and within which the lateral guard at least partially extends. When a top guard includes such a lateral guard channel and a blade-receiving channel 160, these channels may be separated from each other by structural portions of the top guard or these channels may form respective portions of the same opening or other space in the top guard.

Figure 13:
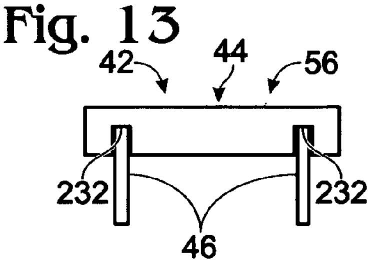
FIG. 13 is a partially schematic front elevation view of a portion of a table saw with another blade guard assembly that includes a lateral guard according to the present disclosure.
Figure 12:
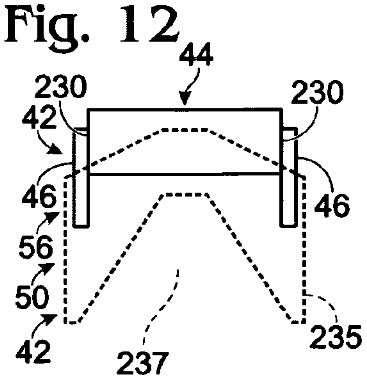
FIG. 12 is a partially schematic front elevation view of a portion of a table saw with a blade guard assembly that includes a lateral guard according to the present disclosure.
Figure 14:
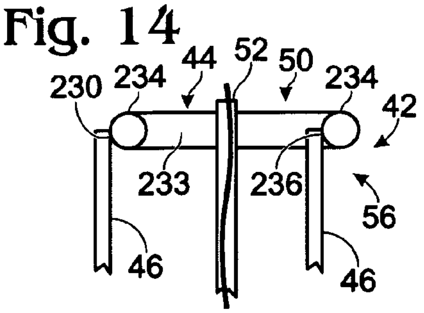
FIG. 14 is a partially schematic front elevation view of a portion of a table saw with another blade guard assembly that includes a lateral guard according to the present disclosure.

In FIG. 12, portions of an illustrative, non-exclusive example of a blade guard assembly 42 are shown in which the blade guard assembly includes a blade guard 56 with a top guard 44 and a pair of lateral guards 46 that are positioned laterally outward from the lateral edges 230 of the top guard. In FIG. 13, portions of an illustrative, non-exclusive example of a blade guard assembly 42 are shown in which the blade guard assembly includes a blade guard 56 with a top guard 44 and a pair of lateral guards 46 that extend from lateral guard channels 232 in the top guard. It is within the scope of the present disclosure that lateral guard channels 232, when present, may extend into but not through the top guard or completely through the top guard. In FIG. 14, portions of an illustrative, non-exclusive example of a blade guard assembly 42 are shown in which the blade guard assembly includes a blade guard 56 with a top guard 44 in the form of a pair of laterally spaced-apart members 234 that define an open passage 233 therebetween. The blade guard further includes lateral guards 46 that are coupled to spaced-apart members 234. In FIG. 14, a lateral guard is shown coupled to the lateral edge 230 of one of the members and to an interior edge 236 of the other member to graphically illustrate that both options are within the scope of the present disclosure. To simplify FIGS. 12 and 13, neither a splitter nor a blade have been illustrated. Also, any suitable coupling mechanism may be utilized to couple the lateral guards for relative movement with respect to the top guard and/or splitter, with specific examples of coupling mechanisms not depicted in the schematically illustrated examples of FIGS. 12-14.

In FIG. 12, an optional front, or nose, guard for a blade guard 56 according to the present disclosure is shown somewhat schematically in dashed lines and is generally indicated at 235. Front guard 235 is coupled to the top guard and/or lateral guards 46 and is positioned for relative movement between a non-cutting position and a range of cutting positions. At least when in a cutting position, the front guard is engaged by a workpiece on the work surface. As the front guard is moved from its non-cutting position to at least some of the range of cutting positions, the front guard may engage the lateral guards to urge the lateral guards from their respective non-cutting positions to a cutting position. As schematically illustrated, the front guard includes a blade-receiving notch 237 into which the blade may pass when the front guard is pivoted or otherwise moved toward the blade by engagement with the workpiece. This notch is not required for all embodiments, as in some embodiments the front guard may need such a notch to avoid contacting the blade.

Figure 15:
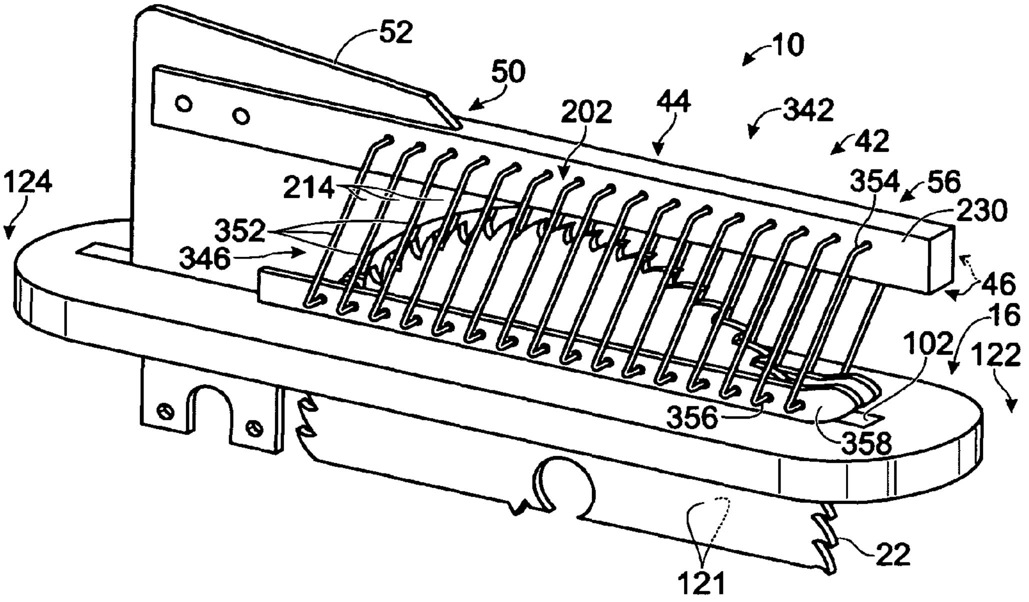
FIG. 15 is an isometric view of a portion of a table saw with a blade guard assembly that includes a lateral guard in the form of a lateral cage guard according to the present disclosure.

In FIG. 15, a less schematic illustrative, non-exclusive example of a blade guard assembly 42 according to the present disclosure is shown and generally indicated at 342. As shown, blade guard assembly 342 includes a splitter assembly 50 with a splitter 52 and a top guard 44. Blade guard assembly 342 further includes a pair of lateral guards 46. Blade guard assembly 42 is shown positioned to obstruct, or restrict, physical access to saw blade 22 by a user when the blade guard assembly is in an operative cutting position. As illustrated, the top guard extends above the saw blade to obstruct access to, and/or contact with, the blade from above the blade. The lateral guards in the illustrated example each project from the top guard toward the work surface 16 to obstruct access to, or contact with, a respective face 121 of the blade. The lateral guards respectively extend adjacent to a face of the blade and are operatively coupled to the top guard for movement within a range of positions relative to the top guard responsive to engagement of the lateral guard by a workpiece on the work surface. As discussed, this range of positions includes at least a non-cutting position and a plurality of cutting positions, with the plurality of cutting positions including a maximum cutting position. As illustrated, lateral guards 46 include top and bottom portions 204 and 206, infeed and outfeed regions 210 and 212, and define a perimetrical area 202. The top and bottom portions define vertical guard distance 208 therebetween and respectively define guard-to-table distances 222 and 224 (not shown in FIG. 15) relative to work surface 16.

In FIG. 15, lateral guard 46 includes a plurality of spaced-apart elongate members, or segments, 352 that are pivotally coupled to top guard 44 and extend therefrom generally toward work surface 16 when the blade guard assembly is installed in an operative position for use while cutting workpieces on the work surface of the table saw. Elongate members 352 may additionally or alternatively be referred to herein as fingers, ribs, spokes, rungs, bars, bands, rods, partitions, wires, and/or members. In FIG. 15, sixteen spaced-apart members 352 are shown, but the number, thickness, length, and relative spacing of members 352 in such a lateral guard may vary without departing from the scope of the present disclosure. As illustrative, non-exclusive examples, lateral guards may include at least 5, 5-10, at least 10, at least 15, at least 20, 10-20, 26, 27, 28, at least 30, or more, members. Lateral guards 46 according to the present disclosure that include such a spaced-apart plurality of elongate members 352 may be referred to herein as lateral cage guards and may be generally indicated at 346.

For the sake of brevity, all of the previously discussed features, optional components, variants, and the like that have elsewhere been described, illustrated, and/or incorporated herein with respect to other lateral guards, blade guards, splitter assemblies, and blade guard assemblies according to the present disclosure will not be discussed again with respect to the lateral cage guards discussed with respect to FIGS. 15-19. Instead, it is within the scope of the present disclosure that the various table saw components, splitters, mounting mechanisms, adjustment mechanisms, fastening mechanisms, top guards, splitter assemblies, defined positions, and variants thereof, that are described, illustrated, and/or incorporated herein may be (but are not required to be) used with lateral cage guards.

In the example of a lateral cage guard 346 shown in FIG. 15, the members are generally equally spaced and define openings 214 therebetween. In this example, the lateral distance between the members is larger than the lateral thickness of the members, thereby providing a user with the ability to see more of the face of the blade through the openings than is obscured by the members. In some embodiments, the openings are sized to preclude the passage of a user's finger between the members and into contact with the blade such as by having the members be spaced-apart by less than one of the above-discussed distances. The illustrative, non-exclusive spacing and relative sizes and configurations of FIG. 15 are not required to all embodiments. It is also within the scope of the present disclosure that the members may be spaced-apart by differing distances, that the members may have different sizes, thicknesses, configurations, etc.

Members 352 each include a proximal region 354 that is at least pivotally coupled to the top guard and/or coupled for pivotal movement relative to the top guard. Members 352 each further include a distal region 356 that is spaced apart from the top guard and extends closer to the work surface than the corresponding proximal region of each member, at least when the lateral guard is in its non-cutting position. Lateral cage guard 346 may additionally or alternatively be referred to herein as a screen or framework that includes a plurality of spaced-apart screen or frame members. In addition, lateral cage guard 346 may be described as embodying a collapsible screen or collapsible framework.

In the illustrated example, the members are secured together for relative movement as a unit relative to the top guard by a brace 358. As illustrated, the brace supports the distal regions of the members for relative movement as a unit relative to the top guard, with the distal regions also being pivotally coupled to the brace. Brace 358 may additionally or alternatively maintain the relative spacing of the members relative to each other. As illustrated, brace 358 extends from the infeed region of the lateral guard to the outfeed region of the lateral guard, but this is not required to all embodiments. It is within the scope of the present disclosure that the brace may engage portions of the members other than the distal regions, that the lateral guard may include more than one brace 358, and that the lateral guard may be formed without a brace 358.

When in the non-cutting position, the brace and/or the distal regions of the members may extend into contact with the work surface, as shown in FIG. 15. Alternatively, the brace and/or distal regions of the members may extend proximate, but not in contact with, the work surface, as it may be desirable in some embodiments to permit a slight spacing between the bottom surface of the lateral guard and the work surface. In FIG. 15, the members are shown extending at an inclined angle relative to the plane of the work surface, with the distal regions of the members extending generally toward the outfeed region 124 of the work surface and the infeed regions of the members extending generally away from the infeed region of the work surface. Other non-cutting positions may be utilized.

Figure 16:
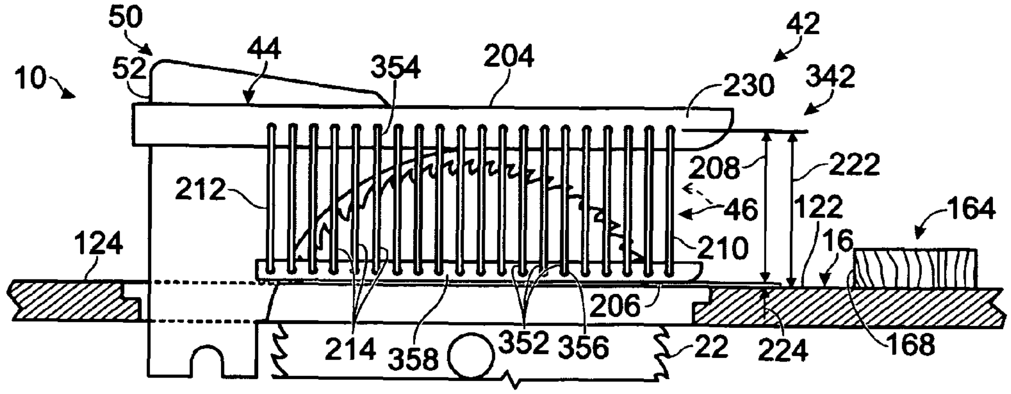
FIG. 16 is a side elevation view of a portion of a table saw with the blade guard assembly with a lateral cage guard of FIG. 15 shown in its non-cutting position.

To graphically illustrate this point, another illustrative, non-exclusive example of a blade guard assembly 342 with a lateral cage guard according to the present disclosure is shown in FIG. 16. As illustrated, in the non-cutting position, the lateral guard of FIG. 16 includes members 352 that extend normal to the plane of the work surface when the lateral guard is in its non-cutting position, and optionally when the blade guard assembly is oriented at a sufficient height above the work surface of the table to permit this normal configuration. FIG. 16 provides a graphical example of a lateral cage guard in which the brace extends above the work surface when the lateral guard is in its non-cutting position (such as introduced previously as being within the scope of the present disclosure), but it is within the scope of the present disclosure that the illustrated lateral guard may include a brace that contacts the work surface when the lateral guard is in its non-cutting position. It is further within the scope of the present disclosure that a lateral cage guard 346 may include members extending at different angles relative to each other, and/or that a lateral guard may include two or more pluralities of members, such as spaced at different respective distances from the face of the blade.

Figure 17:
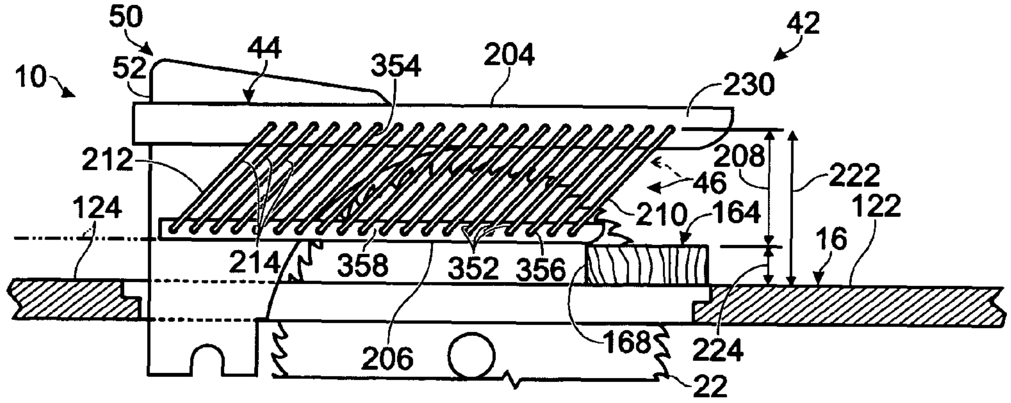
FIG. 17 is a side elevation view of a portion of a table saw with the blade guard assembly with a lateral cage guard of FIG. 15 shown in a cutting position.
Figure 18:
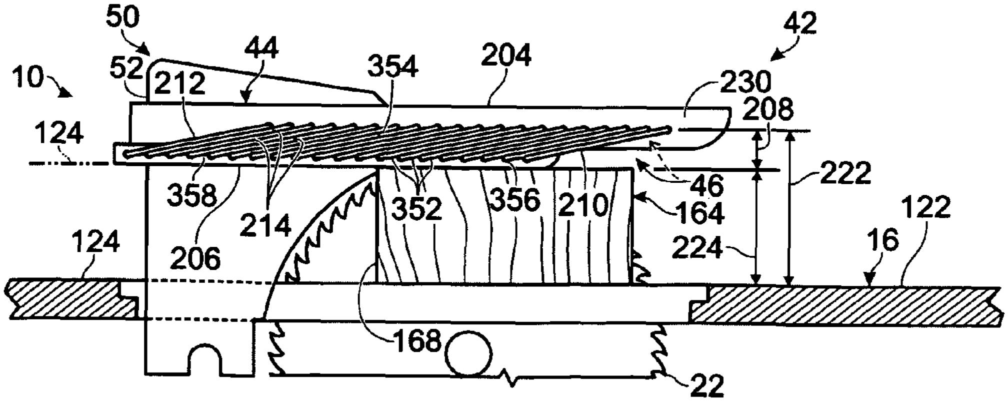
FIG. 18 is a side elevation view of a portion of a table saw with the blade guard assembly with a lateral cage guard of FIG. 15 shown in its maximum cutting position.

In FIG. 17, the lateral cage guard is shown in one of a plurality of cutting positions within the range of cutting positions, and in FIG. 18, the cage lateral guard is shown in its maximum cutting position. As discussed, lateral guards according to the present disclosure are moved from the non-cutting position to the range of cutting positions as a workpiece 164 on the infeed region 122 of work surface 16 is moved toward and into contact with the blade 22, such as to make a cut in the workpiece. In the illustrated examples, the workpiece engages the infeed region 210 of the lateral guard (s). This (direct or indirect) engagement causes the lateral guard to pivot generally toward the outfeed region of the work surface, with the perimetrical area of the lateral guard being reduced as the lateral guard also collapses toward the top guard and/or away from the work surface.

In FIG. 17, it can be seen that the vertical guard distance of the lateral guard has decreased relative to the vertical guard distance when the lateral guard was in the non-cutting position. In FIG. 18, the vertical guard distance has further decreased. As lateral cage guard 346 is moved from its non-cutting position through the range of cutting positions to the maximum cutting position, members 352 move as a unit relative to the top guard. In the illustrated example, this movement is primarily a pivotal movement, and the members also move as a unit relative to brace 358, again with primarily a pivotal movement. When the workpiece is no longer in contact with the lateral guard, the lateral guard may automatically return to the non-cutting position.

As graphically depicted in FIG. 18, the vertical guard distance is approximately equal to the thickness of the top guard. It is within the scope of the present disclosure that lateral guards according to the present disclosure may have a vertical guard distance that is approximately the same as, the same as, or even less than the thickness of a corresponding top guard of the blade guard assembly. The lateral guards shown in FIGS. 15-18 also provide graphical illustrations of lateral guards that do not project above the top of a corresponding top guard regardless of whether the lateral guard is in its non-cutting position, a cutting position, or even its maximum cutting position. A potential benefit of such a construction is that portions of the lateral guard do not project above the top guard, much less in a manner in which a user's visibility of the blade and/or access to the area above the top guard is impaired.

As discussed, the distance between a top guard and the work surface of a table saw may be adjustable, such as with a suitable blade adjustment mechanism. In dashed lines in FIGS. 17 and 18, the vertical guard distance of the lateral guard is also shown being reduced as the top guard is adjusted toward work surface 16. These illustrative graphical representations demonstrate that lateral cage guard 346 may be used even in situations in which the distance between a corresponding top guard and the work surface is adjustable, such as to accommodate cuts of different thicknesses.

As discussed, when a blade guard assembly 42 according to the present disclosure, such as blade guard assembly 342, includes a pair of lateral guard 46, such as a pair of lateral guards 346, the lateral guards may be configured for independent or coupled movement relative to each other. By coupled movement, it is meant that both lateral guards are moved from a non-cutting position to a cutting position even if the workpiece only contacts one of the lateral guards. In other words, movement of one of the lateral guards causes a responsive movement of the other lateral guard. By independent movement it is meant that one of the lateral guards may be moved from a non-cutting position to a cutting position, or within the range of cutting positions, without causing or requiring a corresponding movement of the other lateral guard.

Figure 19:
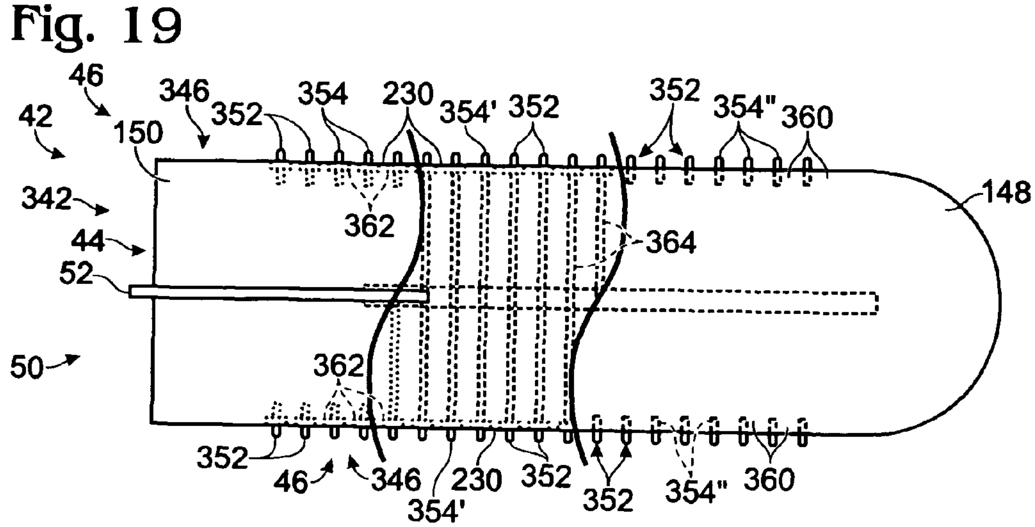
FIG. 19 is a partially schematic top plan view of a blade guard assembly that includes a lateral cage guard according to the present disclosure.

FIG. 19 provides somewhat schematic, illustrative, non-exclusive examples of suitable mechanisms for coupling the members of a lateral cage guard 346 to a top guard 44. At 354, the proximal regions of a plurality of members 352 are shown extending through the lateral edge 230 of top guard 44. The proximal regions may additionally or alternatively be described as extending into the body of the top guard. The portions of the proximal regions that extend into the body of the top guard may be received into any suitable opening, channel, recess, or passage in the top guard. In the illustrated example, regions 354 are shown extending into passages 360 in the form of bores in the lateral edge 230 of the top guard. Other shapes and sizes of passages may be used without departing from the scope of the present disclosure. Similarly, other mechanisms for coupling the proximal regions 354 of members 352 may be used without departing from the scope of the present disclosure.

As indicated at 362, the blade guard assembly may include one or more optional retainers that are adapted to prevent removal or disconnection of the proximal regions of the members from the top guard. In some embodiments, the extension of the proximal region of a member into a passage, bore, or other portion of the top guard may be sufficient to prevent unintentional removal or disconnection of the member with the top guard. In other embodiments, retainers may engage the proximal regions of the members to restrict removal thereof from the top guard. In the portion of FIG. 19 depicting proximal regions 354, a pair of lateral guards is shown, but no interconnection between the lateral guards is present, other than the fact that they are both coupled to the same top guard. In such an embodiment, the lateral guards may be moved independent of each other within the range of previously discussed positions, such as the non-cutting position, the plurality of cutting positions and the maximum cutting position. While not required, this construction may be desirable in such situations such as when the blade and splitter are tilted relative to the plane of the work surface.

At 354' in FIG. 19, the proximal regions of a plurality of members 352 are shown being interconnected by a bridge member 364. Bridge member 364 couples the proximal region of a member of a lateral guard on one side of the top guard with a corresponding proximal region of a member of a lateral guard on the other side of the top guard so that pivotal or other movement of one of the members causes a responsive movement of the other of the members. Bridge member 364 may extend between the lateral edges of the top guard, such as through a bore in the body of the top guard and/or through a cavity or chamber defined between the lateral edges of the top guard.

At 354" in FIG. 19, the proximal regions of a plurality of members 352 are shown extending into openings 360 in the form of slots that permit pivoting of the proximal regions relative to the top guard, as well as sliding or other lateral movement of the proximal regions generally toward and/or away from the infeed and outfeed regions of the top guard.

Figure 20:
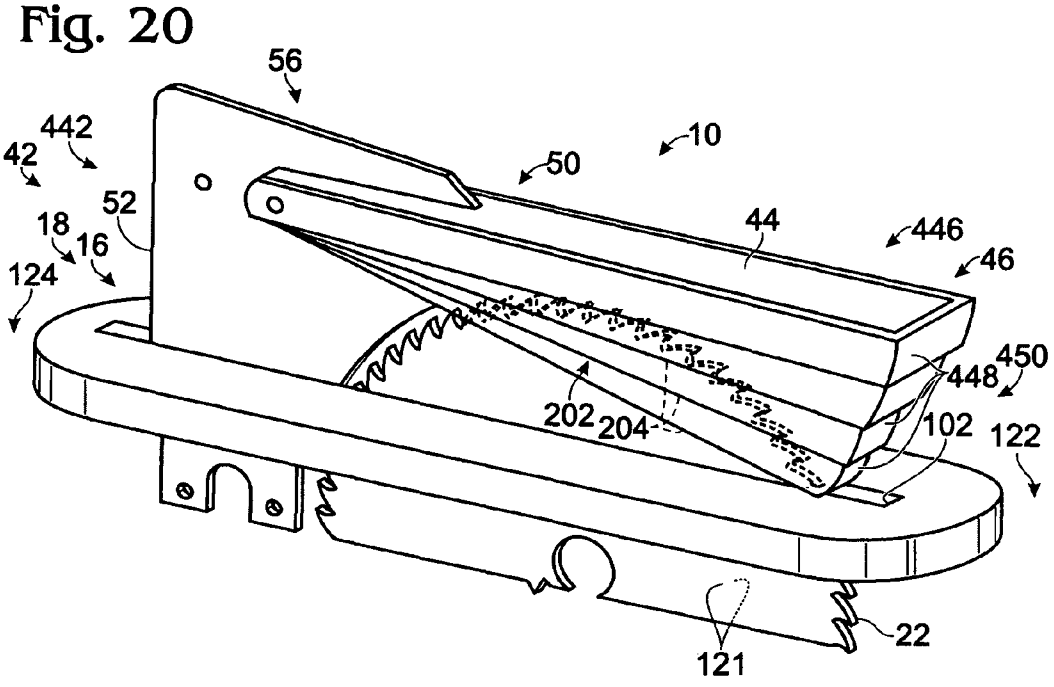
FIG. 20 is a side elevation view of a portion of a table saw with a blade guard assembly that includes a lateral guard in the form of a lateral shroud guard according to the present disclosure, with the lateral shroud guard shown in its non-cutting position.

In FIG. 20, another illustrative, non-exclusive example of a blade guard assembly 42 with a lateral guard 46 according to the present disclosure is shown. As illustrated, lateral guard 46 includes a plurality of shrouds, or shroud members, 448 that extend proximate to the faces of a saw's blade 22 and which collectively provide a barrier, or obstruction, to restrict a user's body from contacting the blade when the blade guard assembly is in an operative position. The example of a lateral guard 46 shown in FIG. 20 may be referred to as a lateral shroud guard 446, as each of the plurality of shrouds defines a portion of a collapsible enclosure that is coupled to the splitter assembly. For example, the shroud members may be slightly offset in shape and/or size to define a nested assembly of the shroud members. A blade guard assembly 42 that includes at least one lateral shroud guard 446 may also be indicated herein as a blade guard assembly 442. In the illustrated example, each shroud extends in a spaced relation to both faces 121 of the saw's blade to inhibit a user's body from contacting both of the faces, as well as the teeth at the infeed region of the work surface. This construction is not required to all embodiments, and it is within the scope of the present disclosure that a lateral guard 46 in the form of a lateral shroud guard 446 may extend proximate to only one of the faces of the blade and/or that a blade guard assembly 442 may include a pair of lateral shroud guards with each of the lateral shroud guards extending proximate to a respective one of the faces of the blade to obstruct lateral contact therewith by a user's body.

For the sake of brevity, all of the previously discussed features, optional components, variants, and the like that have elsewhere been described, illustrated, and/or incorporated herein with respect to other lateral guards, blade guards, splitter assemblies, and blade guard assemblies according to the present disclosure will not be discussed again with respect to the lateral shroud guards discussed with respect to FIGS. 20-23. Instead, it is within the scope of the present disclosure that the various table saw components, splitters, mounting mechanisms, adjustment mechanisms, fastening mechanisms, top guards, splitter assemblies, defined positions, and variants thereof, that are described, illustrated, and/or incorporated herein may be (but are not required to be) used with lateral shroud guards.

In FIG. 20, an illustrative, non-exclusive example of a lateral shroud guard 446 is shown in its non-cutting position. As shown, the plurality of shrouds 448 are coupled for pivotal movement relative to the splitter assembly 50. The plurality of shrouds may be directly or indirectly pivotally coupled to any suitable portion of splitter assembly 50, such as to splitter 50 and/or a top guard 44 (when present). In the specific illustrated example, the plurality of shrouds 448 are pivotally coupled to a top guard 44, but this is not required to all embodiments. Additional illustrative, non-exclusive examples include having at least one of the plurality of shrouds pivotally coupled to the splitter assembly and at least one of the plurality of shrouds pivotally coupled to another of the plurality of shrouds.

In at least the non-cutting position, the adjacent ones of the plurality of shrouds 448 will at least partially overlap to collectively form a barrier, or partition, that obstructs at least lateral access to the blade by a user's body, such as a user's fingers. This barrier may extend across all or a portion of the corresponding face, or faces, of the blade. In the illustrated example, the lateral shroud guard extends from the splitter assembly across at least a portion of the faces of the blade from the splitter to infeed region 122 of work surface 16. As illustrated, the lateral shroud guard extends in contact with the infeed region of the work surface when the lateral shroud guard is in its non-cutting position. However, this is not required to all embodiments, and it is within the scope of the present disclosure that the lateral shroud guard may not engage the work surface when the lateral shroud guard is in its non-cutting (or cutting) position.

In the illustrated example, the lateral shroud guard also extends around at least a portion of the blade's teeth (or cutting region) that extends toward the infeed region of the work surface, thereby providing a barrier that extends from one face of the blade, around the infeed region of the blade, and to the opposite face of the blade. As illustrated, the protective barrier formed by the lateral shroud guard has a generally C-shaped, arcuate configuration, but this is not required to all embodiments. As also shown in the illustrated, non-exclusive example of FIG. 20, the barrier is shown to be a solid barrier, which may be formed of any suitable material, including a transparent material. However, it is within the scope of the present disclosure that the lateral shroud guard may include one or more openings 214, such as that extend through one or more of the shroud members and/or between adjacent shroud members. Openings 214 may reduce the overall weight of the lateral shroud guard and/or provide lines of sight for a user to see the blade and/or portions of the work surface or workpiece through lateral shroud guard.

Figure 21:
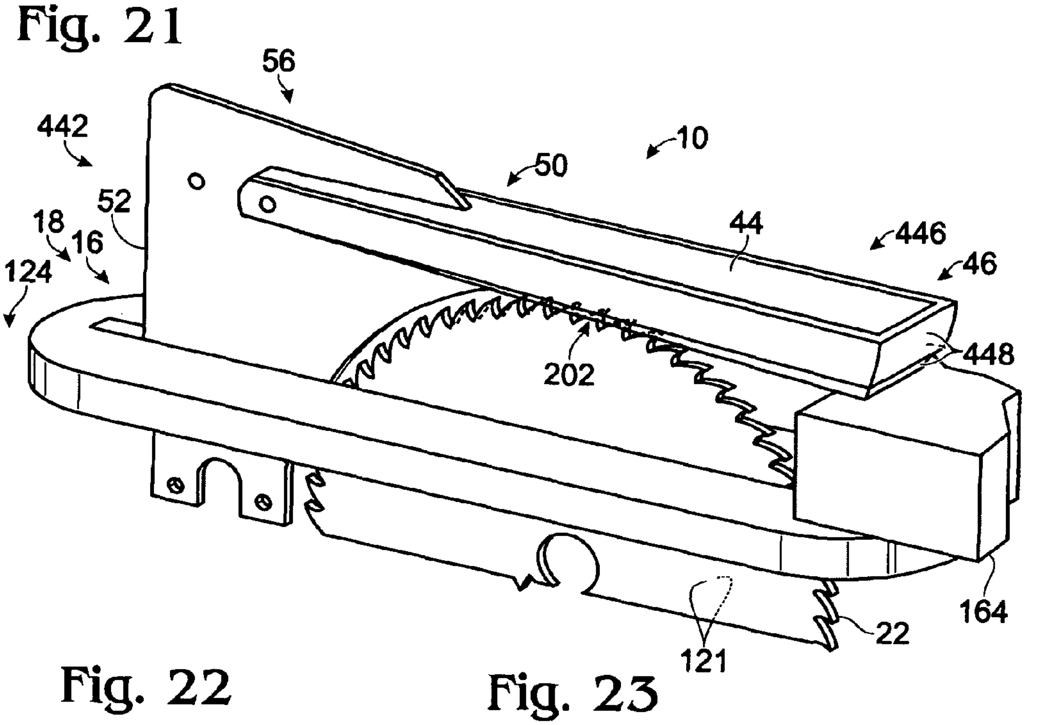
FIG. 21 is a side elevation view of a portion of a table saw with the blade guard assembly with the shroud guard of FIG. 20 shown in its maximum cutting position.

In FIG. 21, the lateral shroud guard of FIG. 20 is shown in a maximum cutting position, such as responsive to engagement by workpiece 164 (or alternatively responsive to lowering of the blade guard relative to the work surface). In the illustrated example, the lateral shroud guard has collapsed to have a substantially reduced perimetrical area 202 and vertical guard distance 208 than when in the non-cutting position shown in FIG. 20. As shown, the vertical guard distance is approximately the thickness of the top guard, and the shrouds substantially (or even completely) overlap with each other, but this is not required to all embodiments. Similar to previously discussed embodiments, it is within the scope of the present disclosure that the shrouds extend external or internal to the lateral edges of the top guard when implemented with a blade guard assembly that includes a top guard. The illustrated example of FIGS. 20 and 21 depict the shrouds extending external to the lateral edges 230 of the top guard. Alternatively, the top guard may include an internal chamber or recess into which the shrouds selectively extend, such as when the lateral shroud guard is in its maximum cutting position. In such an embodiment, the shroud guard may be completely contained within the lateral perimetrical area of the top guard when the lateral guard is in its maximum cutting position, although this is not required to all embodiments.

In embodiments where the lateral shroud guard extends in front of the blade, the infeed region 210 of the lateral shroud guard should be configured so that the lateral shroud guard may collapse from its non-cutting position to a cutting position without inhibiting further movement of the workpiece toward the blade. In this context, by "in front of the blade," it is meant that the lateral shroud guard extends in a position in which the lateral shroud guard will be contacted before the blade by a workpiece that is moved along the work surface from the infeed region toward the blade. Accordingly, the infeed region 210 of the lateral shroud guard may include, or be coupled to, a lift mechanism that urges the lateral shroud member from its non-cutting position toward its maximum cutting position responsive to engagement of the lateral shroud guard by the workpiece as the workpiece is moved from the infeed region of the work surface toward the blade. As discussed, the lift mechanism also should not impair further movement of the workpiece toward the blade as it provides this lifting, or upward collapsing, of the lateral shroud guard away from the work surface.

An illustrative, non-exclusive example of a lift mechanism is generally indicated at 450 in FIG. 20 and is provided by the angular orientation, or slope, of the shrouds 448 relative to the infeed region of the work surface. Other embodiments may be utilized, including lift mechanisms that are separately formed from the lateral shroud guard and which are coupled thereto such that the workpiece engages the lift mechanism, which in turn engages the lateral shroud guard to result in movement of the lateral shroud guard toward its maximum cutting position.

As discussed, the plurality of shrouds 448 may be separately or collectively coupled to the splitter assembly. Each of the individual shrouds 448 may optionally be coupled to one or more of the other shrouds, such as to define, guide, or otherwise enable or provide for relative movement of the shrouds as the lateral shroud guard is moved to and from its non-cutting and cutting positions. In some embodiments, the shrouds may be interconnected by a coupling to limit the degree to which one of the shrouds may move relative to an adjacent shroud. For example, the shrouds may be connected so that they cannot be sufficiently separated to define an opening therebetween of sufficient size for a user's finger to pass between the shrouds. In such an embodiment, at least one of the interconnected shrouds may include or define a stop that limits the relative movement of at least another of the shrouds with respect thereto, such as to prevent this opening from being formed between the shrouds. Additionally or alternatively, top guard 44 (when present) may be coupled to at least one of the shrouds by such a coupling, and the top guard and/or shroud may include such a stop to limit the relative movement of the shroud relative to the top guard.

Figure 22:
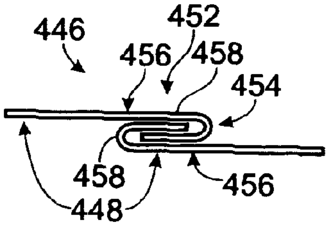
FIG. 22 is a fragmentary cross-sectional view of an illustrative, non-exclusive example of a suitable linkage mechanism for coupling adjacent shroud members together to selectively provide collective and independent relative movement of the shroud members.
Figure 23:
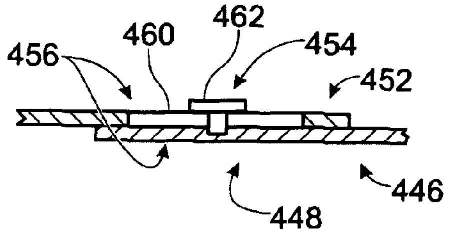
FIG. 23 is a fragmentary cross-sectional view of another illustrative, non-exclusive example of a suitable linkage mechanism for coupling adjacent shroud members together to selectively provide collective and independent relative movement of the shroud members.

In FIGS. 22 and 23, illustrative, non-exclusive graphical examples of these optional couplings and stops are depicted at 452 and 454, respectively. In FIG. 22, overlapping portions 456 of adjacent shrouds 448 are shown with flanges 458 that engage each other as the shrouds are pivoted or otherwise moved relative to each other to define (when the flanges are in engagement) a maximum distance that the shrouds may move apart from each other as the lateral shroud guard is moved between its non-cutting and cutting positions. In FIG. 23, overlapping portions 456 include a slot, or track 460, within which a pin 462 extends at least into, if not through, the track to limit the degree to which the shrouds may be pivoted or otherwise moved away from each other as the lateral shroud guard is moved between its non-cutting and cutting positions.

The vertical orientation of the shrouds may vary within the scope of the present disclosure, including shrouds having completely upright configurations in a vertical direction and shrouds having inclined vertical orientations, such that the top portion of one shroud member may extend laterally outward to a greater degree than the bottom portion of an adjacent, lower, shroud member. In this latter embodiment, the generally C-shaped configuration of the shrouds having this inclined orientation provides a stop that inhibits separation of the adjacent shrouds.

Figure 24:
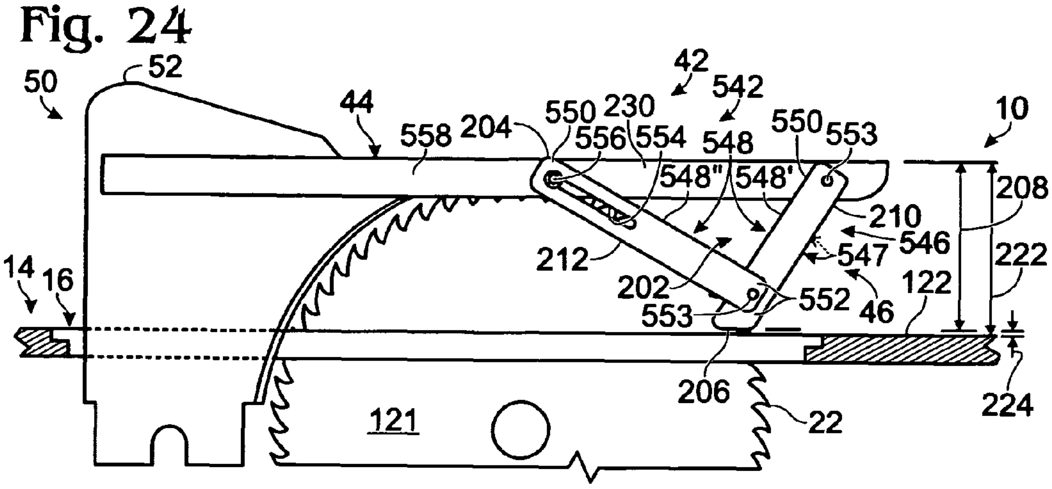
FIG. 24 is a side elevation view of a portion of a table saw with a blade guard assembly that includes a lateral guard in the form of a lateral linkage guard according to the present disclosure, with the lateral linkage guard shown in its non-cutting position.

In FIG. 24, another illustrative, non-exclusive example of a blade guard assembly 42 with a lateral guard 46 according to the present disclosure is shown. As illustrated, lateral guard 46 includes a plurality of links, or linkage members, 548 that extend proximate to the faces of a saw's blade 22 and which collectively provide a barrier, or obstruction, to restrict a user's body from contacting at least the teeth or other cutting region of the blade from a lateral direction when the blade guard assembly is in an operative position. The example of a lateral guard 46 shown in FIG. 24 may be referred to as a lateral linkage guard 546, as each of the plurality of links defines a portion of a collapsible enclosure that is coupled to the splitter assembly. A blade guard assembly 42 that includes at least one lateral linkage guard 546 may also be indicated herein as a blade guard assembly 542 or a linkage blade guard assembly 542.

For the sake of brevity, all of the previously discussed features, optional components, variants, and the like that have elsewhere been described, illustrated, and/or incorporated herein with respect to other lateral guards, blade guards, splitter assemblies, and blade guard assemblies according to the present disclosure will not be discussed again with respect to the lateral linkage guards discussed in connection with FIGS. 24-31. Instead, it is within the scope of the present disclosure that the various table saw components, splitters, mounting mechanisms, adjustment mechanisms, fastening mechanisms, top guards, splitter assemblies, defined positions, and variants thereof, that are described, illustrated, and/or incorporated herein may be (but are not required to be) used with lateral linkage guards.

In the example shown in FIG. 24, the lateral linkage guard 546 includes a linkage assembly 547 with a pair of links 548 that are coupled at one end region 550 to top guard 44 for relative movement with respect thereto, and which are coupled together at another end region 552 for relative movement with respect to each other. Lateral linkage guard 546 may include a linkage assembly 547 on each side of the top guard and/or a linkage assembly 547 positioned to extend proximate each face 121 of the blade to obstruct lateral access thereto. As illustrated, lateral linkage guard 546 (as with the other lateral guards described and/or illustrated herein) include top and bottom portions 204 and 206, infeed and outfeed regions 210 and 212, and define a perimetrical area 202. The top and bottom portions define vertical guard distance 208 therebetween and respectively define guard-to-table distances 222 and 224 relative to work surface 16. In FIG. 24, the lateral linkage guard is shown with a bottom portion 206 that is elevated above the work surface when the lateral linkage guard is in its non-cutting position, but this is not required to all embodiments, as some lateral linkage guards may contact the work surface when the lateral linkage guard is in its non-cutting position.

As shown in FIG. 24, the lateral linkage guard does not obstruct visibility or access to the entire face of the blade. However, it does extend laterally across at least a portion of the face of the blade, including the teeth or other cutting region of the infeed region of the blade. The amount of the blade to be covered by a particular embodiment may vary within the scope of the present disclosure, including embodiments that cover the entire cutting region of the blade forward of the splitter and above the work surface, embodiments that cover the cutting region of the blade between the top guard and the work surface, etc.

In the illustrative, non-exclusive example of a lateral linkage guard 546 shown in FIG. 24, one of links 548 (as indicated at 548') is coupled for pivotal movement relative to top guard 44 and relative to the other link 548. Any suitable pivotal fastening mechanism 553 may be utilized to provide this pivotal connection. The other link 548 (indicated at 548") is configured for both pivotal and sliding movement with respect to the top guard. In the example shown in FIG. 24, link 548" includes an elongate slot 554 into which a pin or other projection 556 of the top guard extends to guide the movement of the link relative to the top guard. Slot 554 may additionally or alternatively be referred to and/or take the form of a recess, guide, track, or race, within the scope of the present disclosure and may extend partially or completely through the link or other structure in which it is formed. Slot 554 may additional or alternatively be described as guiding and/or bounding the range of movement of the lateral guard assembly, such as by guiding and/or bounding the range of movement of the corresponding pin, projection, or other portion of the lateral guard that is coupled to travel within the slot.

Figure 25:
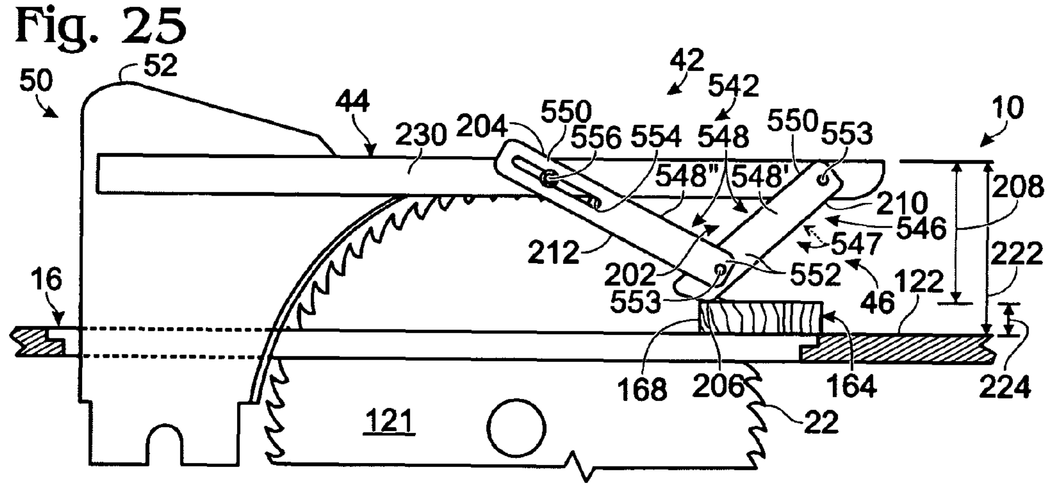
FIG. 25 is a side elevation view of a portion of a table saw with the blade guard assembly with the lateral linkage guard of FIG. 24 shown in a cutting position.
Figure 26:
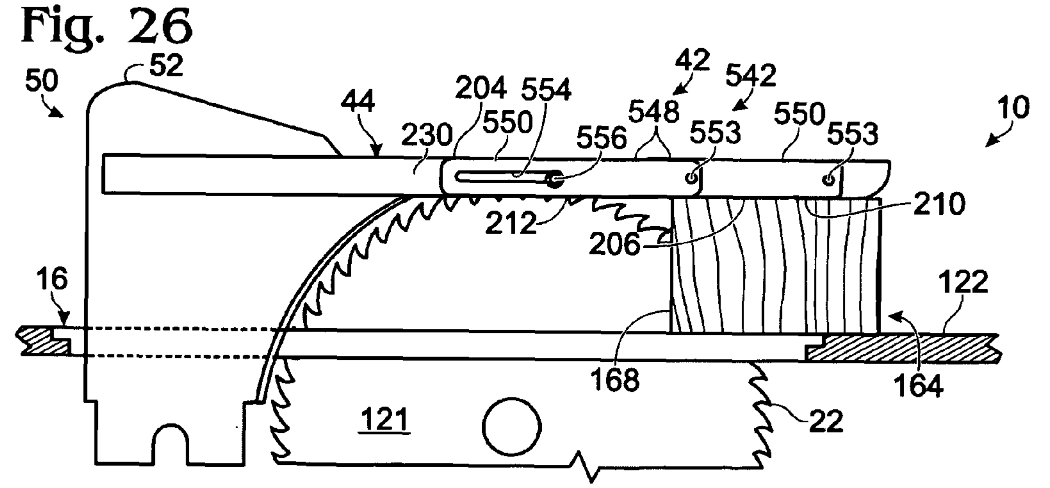
FIG. 26 is a side elevation view of a portion of a table saw with the blade guard assembly with the lateral linkage guard of FIG. 24 shown in its maximum cutting position.

This movement may be responsive to a workpiece 164 on infeed region 122 of work surface 16 being moved toward blade 22 and into contact with the lateral linkage guard and/or responsive to the workpiece being moved out of engagement with the lateral linkage guard. In the former example, this movement results in the lateral linkage guard being moved from its non-cutting position to a cutting position, such as shown in FIG. 25, or even its maximum cutting position, which is shown in FIG. 26. In the latter example, the lateral linkage guard is returned toward, or to, its non-cutting position, such as after the workpiece is cut or otherwise moved sufficiently away from the blade and at least the infeed region of the work surface. This movement of the lateral linkage guard may also be caused by lowering of the blade guard assembly toward the work surface of the table, as indicated somewhat schematically in dashed lines in FIG. 26, such as may occur when the table saw includes an adjustment mechanism that adjusts the relative height of the splitter assembly (alone or in combination with the blade) relative to the work surface.

As shown in FIG. 26, in the maximum cutting position, the lateral linkage guard may have a perimetrical area and/or vertical guard distance that is less than the corresponding perimetrical area and/or vertical thickness of the lateral edge 230 of the top guard. As also shown, it is within the scope of the present disclosure that the lateral linkage guard may not extend above the top guard when the lateral linkage guard is in the maximum cutting position. FIG. 24 also provides an example of a lateral guard in which the guard-to-table distance of top portion 204 of the lateral guard increases by less than the increase in the guard-to-table distance of the bottom portion of the lateral guard as the lateral guard is moved from the non-cutting position to the maximum cutting position shown in FIG. 26. In fact, in the illustrated example, the guard-to-table distance of the top portion of the lateral linkage guard does not increase, or alternatively does not increase by more than 10%, 15%, or 25%, as the lateral linkage guard is moved from the non-cutting position to the maximum cutting position.

Figure 27:
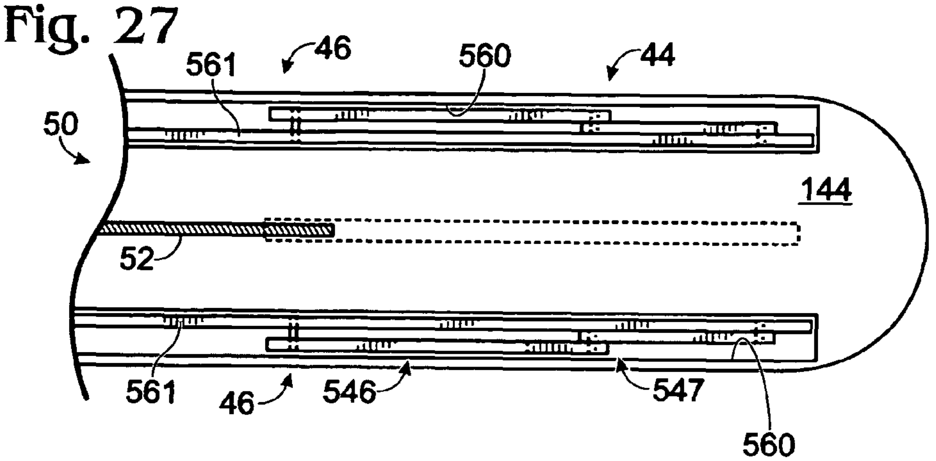
FIG. 27 is a fragmentary bottom plan view of a blade guard assembly with a pair of lateral linkage guards.

In FIG. 27, an example of a lateral linkage guard 546 is shown in which the top guard 44 includes recesses, or channels, 560 extending into the lower surface 144 of the top guard. The linkage assemblies 547 at least partially extend into the recesses. When the lateral linkage guard is in its maximum cutting position, it is within the scope of the present disclosure that a majority, substantially all, or even all of the linkage assemblies are received into the recesses, which may be referred to as lateral guard receiving recesses. In the illustrative, non-exclusive example shown in FIG. 27, each of the linkage assemblies is depicted as being coupled to a frame, or support, 561 at least partially defines the position of the linkage assemblies relative to the channels. Support 561 may be formed from a different material than the top guard, and it is within the scope of the present disclosure that the frames may be interconnected, may be regions of a monolithic structure, or that the linkage assemblies may be secured directly to the sidewalls of the channels within the top guard.

Figure 28:
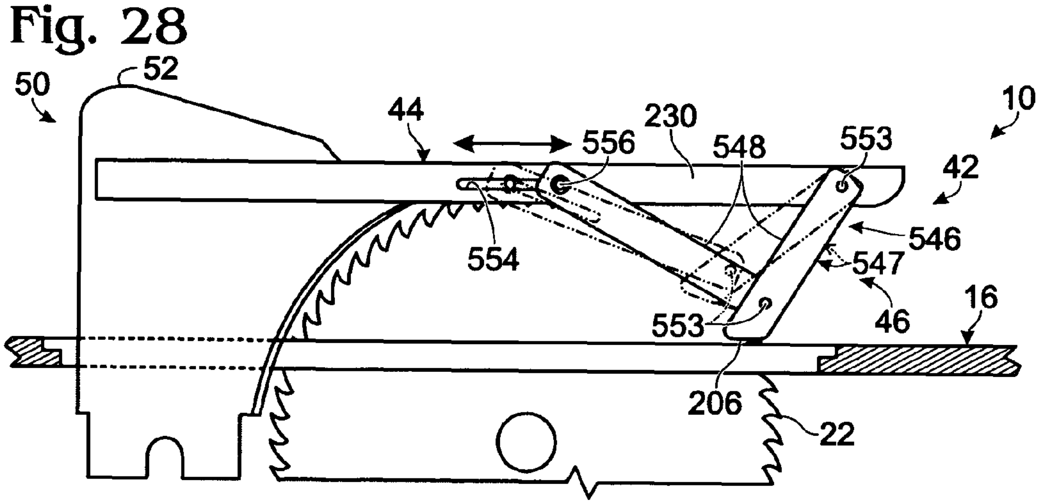
FIG. 28 is a fragmentary side elevation view of a portion of a table saw with a blade guard assembly that includes another lateral guard in the form of a lateral linkage guard according to the present disclosure, with the lateral linkage guard shown in its non-cutting position.

In FIGS. 24-26, slot 554 was shown in one of the links 548 of the lateral linkage guard. It is within the scope of the present disclosure that the slot may additionally or alternatively be formed in the top guard, with such an embodiment including a pin or other projection 556 extending from the link into the slot in the top guard and thereby guide the movement of the link relative to the top guard. An illustrative, non-exclusive example of such an embodiment of a lateral linkage guard 546 is shown in FIG. 28. As shown, slot 554 is illustrated as extending into a lateral edge 230 of the top guard, with the sliding movement of pin or projection 556 from one of the links 548 of the lateral linkage guard directing movement of the lateral linkage guard between its range of positions. When lateral linkage guard 546 includes a pair of linkage assemblies 547, a single pin, or other projection, 556 may extend between the linkage assemblies, such as through a slot 554 that extends through the top guard. In such a configuration, this common pin (or other projection) may couple the linkage assemblies for movement as a unit, but this is not required to all embodiments. In some embodiments, it may be desirable for the linkage assemblies to be configured for independent movement relative to each other. It is further within the scope of the present disclosure that top guard 44 may include a slot 554 that extends at least into the bottom surface of the top guard, or even through the top guard.

Figure 29:
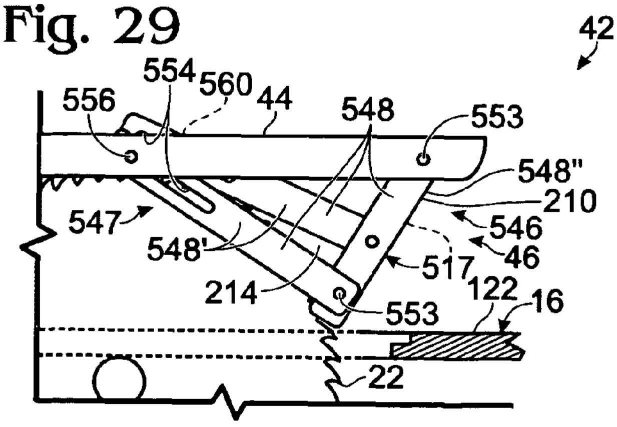
FIG. 29 is a fragmentary side elevation view of a portion of a table saw with a blade guard assembly that includes another lateral guard in the form of a lateral linkage guard according to the present disclosure, with the lateral linkage guard shown in its non-cutting position.

As further additional or alternative examples, a slot 554 may be formed in the end region 552 of at least one of the links, with the end region 552 of the other of the links including a pin, or other projection, 556 that extends into the slot to define the relative movement of the links as the lateral linkage guard is moved between its cutting and non-cutting positions. Specifically, the three pivotal linkage points interconnecting a pair of generally rigid links 548 and top guard 44 do not themselves provide for collapsing of the lateral linkage guard because it forms a triangle. However, when one of the linkage points is associated with a slot or other track or race that enables and defines for pivotal and sliding movement of the corresponding link(s), then the lateral linkage guard may collapse to a configuration having a smaller perimetrical area and/or vertical guard distance, such as discussed and/or illustrated herein. It is within the scope of the present disclosure that linkage assemblies 547 of a lateral linkage guard 546 may include more than two links 548, such as to increase the permissible cutting configurations of the lateral linkage guard and/or to increase the amount of the corresponding face of the blade that is obstructed from lateral access by the linkage assembly. For example, a linkage assembly may include 3, 4, or more interconnected links. FIG. 29 provides an illustrative, non-exclusive example of such a linkage assembly. Specifically, FIG. 29 illustrates a lateral linkage guard with at least one linkage assembly 547 that includes three interconnected links 548. In FIG. 29, two of the links (indicated at 558' in FIG. 29) include slots 554 into which a pin, or other projection 556, of top guard 44 extends, with these links also being pivotally coupled by pivotal fastening mechanisms 553 to the other link 558 (indicated at 558" in FIG. 29) which itself is also pivotally coupled to top guard 44 by a further pivotal fastening mechanism 553. Link 558" defines the infeed region 210 of the linkage assembly, and links 558' extend in an at least partially spaced-apart relationship to collectively obstruct access to portions of blade 22. In some embodiments, links 558" may be positioned to obstruct access to the cutting region of the blade, such as the portion of the infeed region of the blade that extends above work surface 16. In some embodiments, links 558" may be sized and oriented to define an opening 214 therebetween that is sufficiently small to prevent an object of a predetermined diameter or size (such as discussed herein) from passing therethrough. In the example shown in FIG. 29, links 558' extend on opposed sides of link 548", but this configuration is not required to all embodiments of linkage assemblies having three links. As a further optional variant to the depicted illustrative, non-exclusive example shown in FIG. 29, links 548' may include pins, or other projections, 556 that extend within slots 554 in top guard 44. FIG. 29 also provides a graphical example of another lateral linkage guard that includes a lateral guard receiving recess 560 into which the linkage assembly increasingly extends as the lateral linkage guard is moved from its non-cutting position toward its maximum cutting position.

Figure 30:
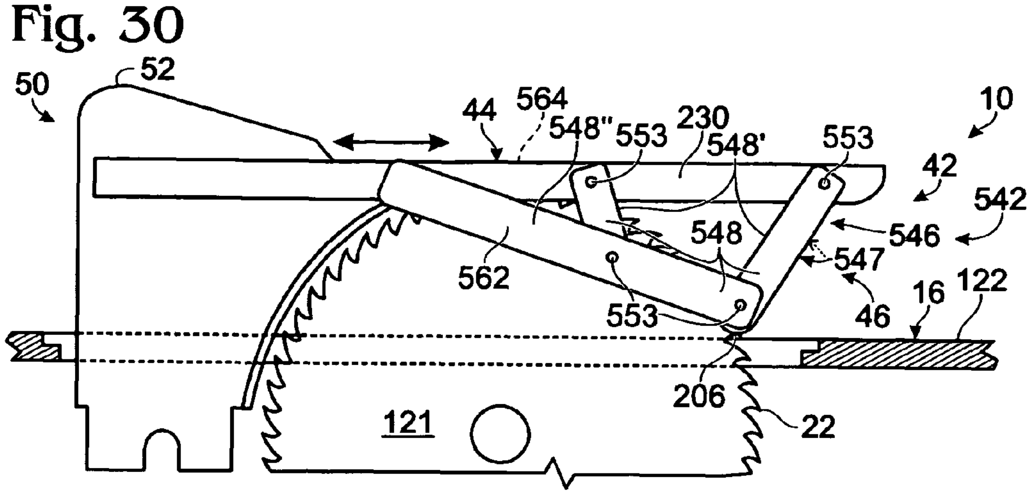
FIG. 30 is a fragmentary side elevation view of a portion of a table saw with a blade guard assembly that includes another lateral guard in the form of a lateral linkage guard according to the present disclosure, with the lateral linkage guard shown in its non-cutting position.
Figure 31:
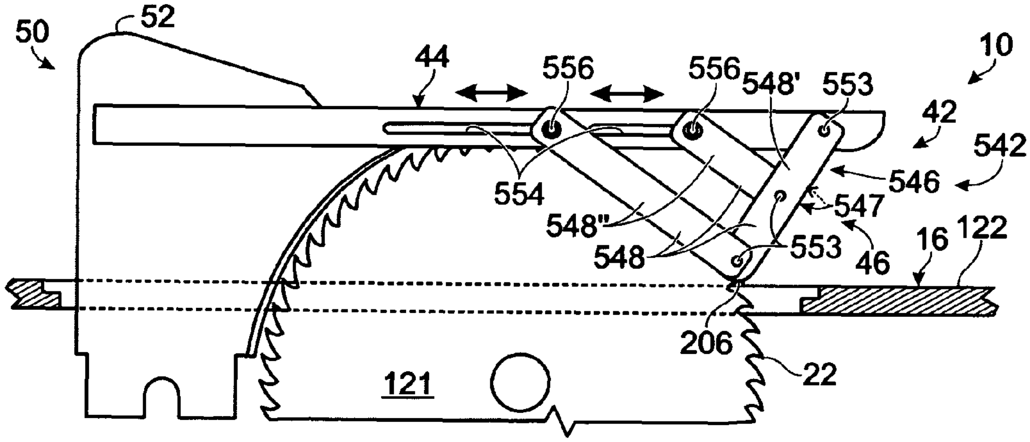
FIG. 31 is a fragmentary side elevation view of a portion of a table saw with a blade guard assembly that includes another lateral guard in the form of a lateral linkage guard according to the present disclosure, with the lateral linkage guard shown in its non-cutting position.

Additional illustrative, non-exclusive examples of lateral linkage guards 546 that include linkage assemblies 547 with three links 548 are shown in FIGS. 30 and 31. In FIG. 30, the linkage assembly 547 includes a pair of spaced-apart links 548 (indicated at 548') with first end regions that are pivotally coupled to a top guard 44, such as to a lateral edge thereof, and second end regions that are pivotally coupled to a third link 548 (indicated at 548"). In the illustrated example, end region 562 of the third link is free from a direct linkage or other connection to the top guard. Instead, the end region 562 of the link that extends proximate the top guard may extend adjacent lateral edge 230 of the top guard, such as external the top guard or through an optional passage 564 in the top guard. As a further alternative, end region 562 of link 548" may be connected to the top guard with a pin-and-slot mechanism that guides a path of travel for the end region of this third link relative to the top guard. When in its maximum cutting position, all three links may extend in a generally parallel configuration along the lateral edge of the top guard.

In FIG. 31, the linkage assembly includes a link 558 (indicated at 558') that is pivotally coupled to the top guard at or proximate the infeed region of the top guard, and a pair of spaced-apart links 558 (indicated at 558") that are coupled to the top guard at elongate slots 554 in the top guard, with the slots defining paths of sliding movement of the corresponding portions of the links relative to the top guard. Although indicated as a pair of spaced-apart elongate slots 554, a single continuous slot 554 may be used without departing from the scope of the present disclosure. In the illustrated example shown in FIG. 31, link 558' may include an optional spacer to provide clearance for the other links when the lateral linkage guard is in its maximum cutting position. Additionally or alternatively, the top guard and/or other links may be sized and/or shaped to provide sufficient clearance. The same spacing options apply for other linkage assemblies described and/or illustrated herein.

The previously discussed figures, and corresponding text, have provided a variety of blade guard assemblies that include lateral guards according to the present disclosure. Various illustrative, non-exclusive examples have been presented, as well as variants to the illustrated examples. In portions of the prior discussion and figures, discrete types of lateral guards have been described and/or illustrated, such as the previously discussed lateral cage guards, lateral shroud guards, lateral linkage guards, etc. It is within the scope of the present disclosure that elements and/or features of these illustrative guards may be utilized together. Similarly, optional accessories and/or features introduced with respect to one of these examples may be used with other lateral guards without departing from the scope of the present disclosure.

Figure 32:
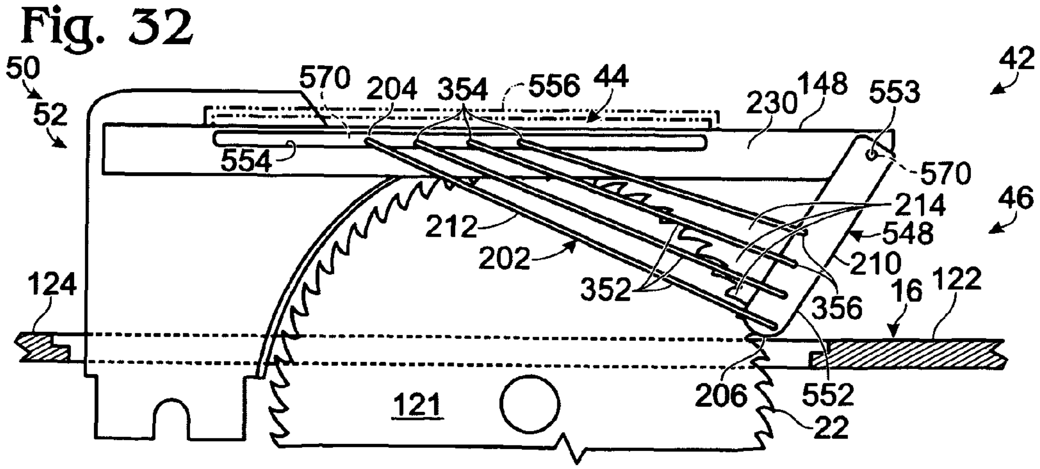
FIG. 32 is a side elevation view of a portion of a table saw with another blade guard assembly according to the present disclosure, with the blade guard assembly illustrated with a lateral guard assembly in a non-cutting position.

FIG. 32 provides a graphical example of a blade guard assembly 42 that includes a lateral guard 46 that includes aspects of at least two of the previously described particular examples of types of lateral guards. As illustrated, lateral guard 46 includes a both a pivotal link 548 and a plurality of generally spaced-apart elongate segments 352 that define openings 214 therebetween. As illustrated, link 548 is pivotally coupled at one end region to infeed guard region 148 of top guard 44, such as with a pivotal fastening mechanism 553, with the other end region 552 generally extending toward work surface 16 of table saw at least when the lateral guard is in a non-cutting position, such as shown in FIG. 32. Similar to other lateral guards within the scope of the present disclosure, the lateral guard may or may not engage the work surface of the table when the lateral guard is in its non-cutting position. In some embodiments, this may be determined by the design of the blade guard assembly, while in others it may depend upon the relative height of the top guard relative to the work surface and/or how a user has configured the blade guard assembly.

As shown in FIG. 32, an end region 356 of each of the plurality of elongate segments 352 is coupled to link 548 for at least pivotal movement relative to the link. The end regions of the segments are shown coupled to spaced-apart regions of along the link. The other end region 354 of the segments is received into a slot, or channel, 554 in, or associated with, top guard 44. This other end region is pivotal and slidable within the slot within a range of positions. When a workpiece engages an infeed region 210 of the lateral guard, it causes link 548 to pivot about pivotal coupling mechanism 553 generally toward the top guard. This movement causes responsive relative movement of the plurality of elongate members 352 generally toward the top guard. As discussed, this collapsing movement of the lateral guard as it is moved from its non-cutting position toward its maximum cutting position may reduce the perimetrical area 202 of the lateral guard, the increase the guard-to-table distance by more than a related decrease in the vertical guard dimension, etc. A maximum cutting position for the guard of FIG. 32 is shown in FIG. 33.

The number, dimension, and relative spacing of the elongate segments 352 may vary from the example depicted in FIG. 32 without departing from the scope of the present disclosure, such as to include more segments, less segments, thicker or wider segments, thinner or narrower segments, segments that are spaced closer together or farther apart, etc. In many embodiments, the spacing between adjacent segments 352 may be selected to be sufficiently small that an object with more than a predetermined cross-sectional area, size, etc. cannot fit through the opening to contact the blade, and more specifically, the teeth or cutting surface of the blade.

Figure 33:
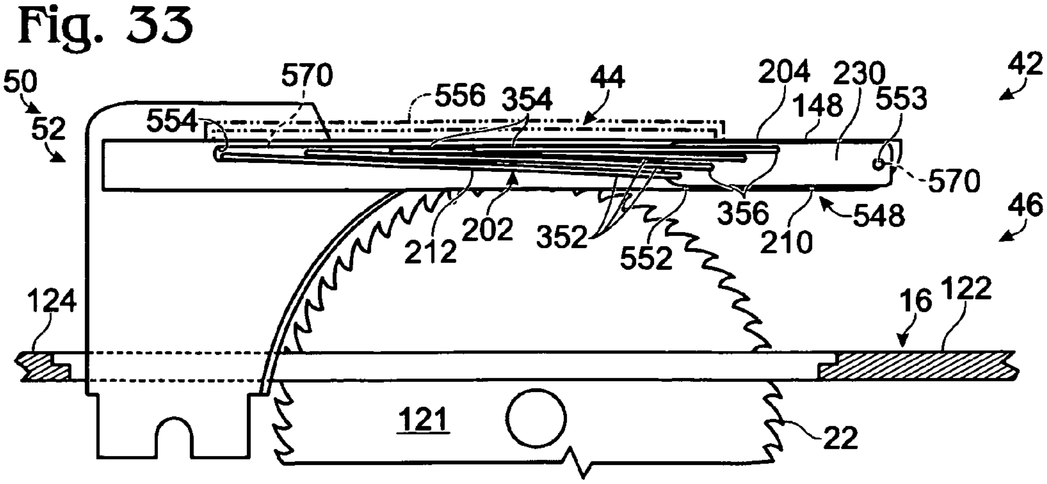
FIG. 33 is a fragmentary side elevation view of portion of a table saw and blade guard assembly of FIG. 32, with the blade guard assembly illustrated with a lateral guard in a maximum cutting position.

In FIGS. 32 and 33, slot 554 is illustrated in solid lines as extending into the lateral edge 230 of top guard 44. This configuration is not required in all embodiments. Another example is a slot 554 that is defined between the upper or lower surface of the top guard and a retainer, or brace, that is positioned in a spaced relationship to the corresponding surface of the top guard to define the slot therebetween. An illustrative, non-exclusive example of such a brace is illustrated in dashed lines in FIG. 32 at 556. It follows that segments 352 may be longer if used with such a brace and shorter if used with a similar brace that is secured below the lower surface of the top guard.

Lateral guards according to the present disclosure may, but are not required to be, biased toward their non-cutting position by a biasing mechanism other than the weight of the lateral guard. For example, the splitter assembly may include a biasing mechanism 570 that is configured to urge a lateral guard toward its non-cutting position. Illustrative, non-exclusive examples of biasing mechanisms 570 include springs, resilient materials, elastomeric materials, and the like. In FIG. 32, an illustrative graphical example of a biasing mechanism 570 is depicted schematically and takes the form of a torsion spring associated with fastening mechanism 553. Another illustrative graphical example of a biasing mechanism 570 is depicted schematically and takes the form of a spring or resilient member that is in slot 554 and configured to urge the corresponding end regions of the segments toward the infeed end region of the top guard, and thereby bias the lateral guard to its non-cutting position.

For the sake of brevity, all of the previously discussed features, optional components, variants, and the like that have elsewhere been described, illustrated, and/or incorporated herein with respect to other lateral guards, blade guards, splitter assemblies, and blade guard assemblies according to the present disclosure will not be discussed again with respect to the lateral guards discussed in connection with FIGS. 32-33. Instead, it is within the scope of the present disclosure that the various table saw components, splitters, mounting mechanisms, adjustment mechanisms, fastening mechanisms, top guards, splitter assemblies, defined positions, and variants thereof, that are described, illustrated, and/or incorporated herein may be (but are not required to be) used with lateral linkage guards.

Figure 34:
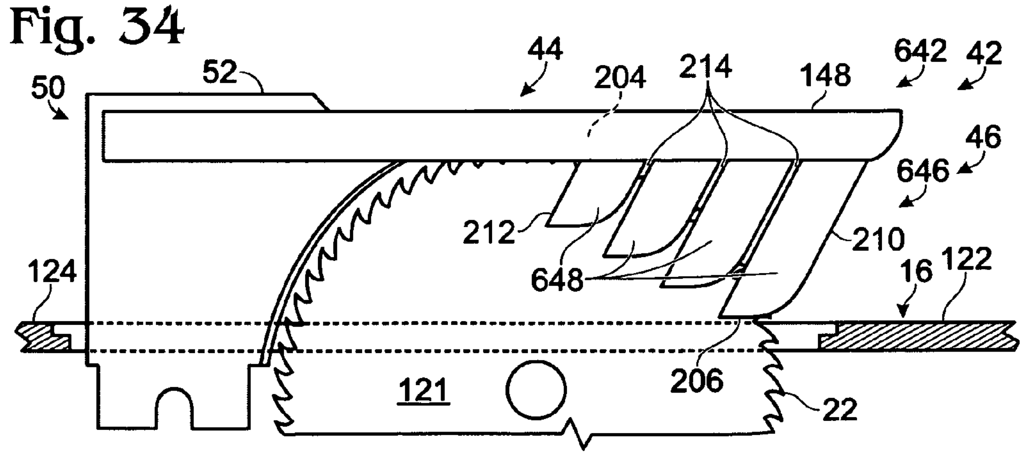
FIG. 34 is a side elevation view of a portion of a table saw with another blade guard assembly according to the present disclosure, with the blade guard assembly illustrated with a lateral guard assembly in a non-cutting position.

In FIG. 34, another illustrative, non-exclusive example of a blade guard assembly 42 with a lateral guard 46 according to the present disclosure is shown. As illustrated, lateral guard 46 includes a lateral guard assembly that includes a plurality of guard members 648 that are coupled to a top guard 44 for pivotal movement relative to the top guard. The guard members of each lateral guard assembly project from the top guard toward the table of the table saw when the lateral guard assembly is in its non-cutting position, such as is shown in FIG. 34. The pivotal range of movement of each of the guard members may be the same or may be different, and each of the guard members has a range of positions that includes at least a non-cutting position and a plurality of cutting positions that include a maximum cutting position. The range of pivotal movement may be defined at least in part by one or more of at least the shape of guard member, its interaction with other guard members, the shape of the top guard region to which the guard member is pivotally coupled, the coupling mechanism utilized, any biasing mechanism utilized, etc. In some embodiments, one or more of the guard members may be pivotally coupled in a range of position in which the guard member may not pivot to extend completely perpendicular to the work surface 16 of the table 14. In such an embodiment, the guard member may be configured to extend in at least its non-cutting position at an angle that projects from the top guard generally toward the outfeed region 124 of the work surface.

The guard members may be coupled to the top guard for independent movement relative to the top guard or for relative movement relative to the top guard. By relative movement, it is meant that pivotal movement of one of the guard members causes a responsive pivotal movement of at least one of the other guard members, such as by the first guard member engaging or otherwise applying forces to another of the guard movements to cause pivotal movement thereof. This responsive pivotal movement may be enabled, for example, by linkages between the guard members, by a producing edge, rib, flange, or other portion on at least one of the guard members to engage and cause responsive movement of at least another of the guard members, etc.

Collectively, the plurality of guard members 648 define a barrier, or obstruction, to restrict a user's body from contacting at least the teeth or other cutting region of blade 22 from a lateral direction when the blade guard assembly is in an operative position. In FIG. 34, four lateral guard members are shown for the purpose of illustration. It is within the scope of the present disclosure that the number of lateral guard members in a particular embodiment may vary and may include fewer or more lateral guard members than are shown in FIG. 34. The number of lateral guard members may vary according to such illustrative, non-exclusive factors as the thickness of the lateral guard members, the spacing of the lateral guard members, the desired maximum opening dimensions between adjacent lateral guard members, the size of blade to be utilized, the lateral area of the blade to be covered by the lateral guard members, user preferences, and design preferences.

The example of a lateral guard 46 shown in FIG. 34 may be referred to as a lateral multi-guard 646, as each of the plurality of guard members defines a portion of a collapsible barrier that is coupled to splitter assembly 50. A blade guard assembly 42 that includes at least one lateral multi-guard 646 may also be indicated herein as a blade guard assembly 642 or a multi-guard blade guard assembly 642. In FIG. 34, the guard members are shown being spaced apart from each other to define openings, or gaps, 214 therebetween at least when the guard members are in their non-cutting position. When so configured, the guard members may be coupled to the top guard and/or sized to that the openings will not permit an object having a size that is greater than a predetermined maximum size to pass therethrough. Illustrative, non-exclusive examples of such sizing considerations have been discussed herein. It is within the scope of the present disclosure that the guard members are sized and/or coupled to the top guard such that the guard members overlap with each other when in the non-cutting, cutting, and maximum-cutting positions and thereby do not define lateral openings between the guard members.

Figure 35:
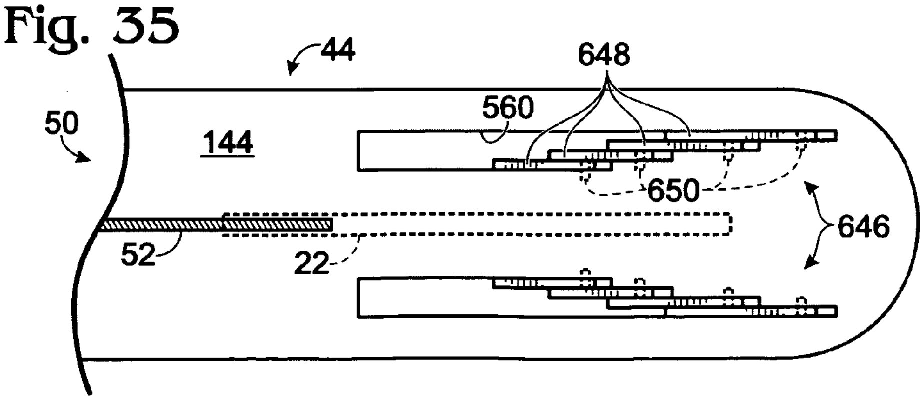
FIG. 35 is a bottom plan view of the blade guard assembly of FIG. 34.

FIG. 35 provides an illustrative, non-exclusive example of a suitable configuration for coupling guard members 648 for pivotal movement relative to the top guard. In FIG. 35, the guard members are shown being partially received into a channel, or recess, 560 in the lower surface 144 of the top guard. When the guard members of the lateral guard assembly are pivoted to their maximum cutting position, each of the guard members at least a majority, if not all, of the guard members may be received into the channel. The guard members are coupled to the body of the top guard by pins 650 or other suitable pivotal linkages. In the illustrated example, the channel is shaped to provide lateral support to the guard members by engaging a lateral sidewall of each guard member, but this configuration is not required to all embodiments.

For the sake of brevity, all of the previously discussed features, optional components, variants, and the like that have elsewhere been described, illustrated, and/or incorporated herein with respect to other lateral guards, blade guards, splitter assemblies, and blade guard assemblies according to the present disclosure will not be discussed again with respect to the lateral multi-guards discussed in connection with FIGS. 34 and 35. Instead, it is within the scope of the present disclosure that the various table saw components, splitters, mounting mechanisms, adjustment mechanisms, fastening mechanisms, top guards, splitter assemblies, defined positions, and variants thereof, that are described, illustrated, and/or incorporated herein may be (but are not required to be) used with lateral multi-guards.

INDUSTRIAL APPLICABILITY

The blade guards and table saws disclosed herein are applicable to the woodworking and power-operated machine industries, including table saws such as cabinet saws, contractor saws, hybrid saws, jobsite saws, and bench top saws.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A table saw, comprising:

a table with a work surface defining a plane and having an infeed region and an outfeed region;

a nominally planar, circular blade configured to extend at least partially above the work surface to cut a workpiece on the work surface as the workpiece is moved into contact with the blade, wherein the blade has a cutting region, opposed faces, and an orientation relative to the work surface;

a motor to drive rotation of the blade relative to the work surface;

a splitter having an orientation relative to the work surface;

a blade adjustment mechanism configured to change the orientation of the blade and the splitter relative to the work surface, wherein the blade adjustment mechanism is adapted to change at least a distance that the blade projects above the work surface, with the blade adjustment mechanism defining a maximum distance that the blade projects above the work surface;

a mounting mechanism configured to position the splitter adjacent the blade;

a blade guard extending from the splitter generally toward the infeed region of the work surface, wherein the blade guard includes a top guard that extends generally above the blade, and further wherein the top guard and the splitter form a splitter assembly; and a lateral guard that forms a portion of the blade guard and which projects from the splitter assembly toward the work surface to at least partially obstruct contact with the blade by a user, wherein the lateral guard extends adjacent a face of the blade and is operatively coupled to the splitter assembly for movement within a range of positions relative to the top guard responsive to engagement of the lateral guard by a workpiece on the work surface, wherein the range of positions includes at least a non-cutting position, in which the lateral guard is positioned to be directly engaged by a workpiece on the infeed region of the work surface prior to engagement of the blade by the workpiece, and a plurality of cutting positions, in which the lateral guard is directly engaged by a workpiece on the work surface and in which the lateral guard is displaced from the non-cutting position, wherein the lateral guard includes a top portion and a bottom portion that both move relative to the top guard and which collectively define a vertical lateral guard distance therebetween, wherein the top portion is the portion of the lateral guard that extends a maximum distance above the work surface, wherein the bottom portion is the portion of the lateral guard that extends closest to the work surface, wherein the vertical lateral guard distance is measured normal to the plane of the work surface, wherein the lateral guard is configured such that the vertical lateral guard distance is less in the plurality of cutting positions than in the non-cutting position, wherein the plurality of cutting positions includes a maximum cutting position in which the bottom portion of the lateral guard is positioned further away from the work surface than in the rest of the plurality of cutting positions, and further wherein in the maximum cutting position the blade guard has a vertical lateral guard distance that is less than half of the maximum distance that the blade projects above the work surface.

2. The table saw of claim 1, wherein the vertical lateral guard distance in the maximum cutting position is less than one half of the vertical lateral guard distance in the non-cutting position.

3. The table saw of claim 1, wherein the top guard has a thickness measured normal to the work surface, and further wherein the vertical lateral guard distance in the maximum cutting position is less than twice the thickness of the top guard.

4. The table saw of claim 1, wherein the top guard has a thickness, and further wherein the vertical lateral guard distance in the maximum cutting position is not substantially greater than the thickness of the top guard.

5. The table saw of claim 1, wherein the top guard is secured in a defined orientation relative to the splitter, and further wherein the top guard has a vertical dimension that is less than the vertical lateral guard distance when the lateral guard is in the non-cutting position.

6. The table saw of claim 1, wherein the top guard is secured in a defined orientation relative to the splitter, and further wherein the top guard has a vertical dimension that is less than the vertical lateral guard distance in the plurality of cutting positions.

7. The table saw of claim 1, wherein the lateral guard is configured to be moved within the plurality of cutting positions responsive to the thickness of a workpiece on the infeed region of the work surface directly engaging the lateral guard.

8. The table saw of claim 1, wherein the lateral guard at least partially vertically collapses as the lateral guard is moved from the non-cutting position to a cutting position.

9. The table saw of claim 1, wherein the top portion of the lateral guard is configured to maintain its orientation relative to the work surface of the table as the lateral guard is moved between the non-cutting position and the plurality of cutting positions.

10. The table saw of claim 1, wherein the blade guard includes a pair of spaced-apart lateral guards; with each of the lateral guards extending proximate a respective one of the sides of the blade, and further comprising a linkage assembly that interconnects the pair of lateral guards for collective movement relative to the splitter.

11. The table saw of claim 1, wherein in the plurality of cutting positions, the top portion of the lateral guard does not extend above the top guard.

12. The table saw of claim 1, wherein the top guard defines at least one lateral guard receiving recess, and further wherein in the plurality of cutting positions, the lateral guard extends into the at least one lateral guard receiving recess.

13. The table saw of claim 12, wherein the at least one lateral guard receiving recess extends into a bottom surface of the top guard.

14. The table saw of claim 13, wherein the plurality of cutting positions includes a maximum cutting position in which the lateral guard is positioned further away from the non-cutting position than in the rest of the plurality of cutting positions, and further wherein at least a substantial portion of the lateral guard extends into the at least one lateral guard receiving recess when the lateral guard is in the maximum cutting position.

15. The table saw of claim 1, wherein the plurality of cutting positions includes a maximum cutting position in which the lateral guard is positioned further away from the non-cutting position than in the rest of the plurality of cutting positions, wherein the top guard includes lateral edges, and further wherein in the maximum cutting position, the top and bottom portions of the lateral guard respectively extend proximate the lateral edges of the top guard.

16. The table saw of claim 1, wherein the lateral guard includes a plurality of interconnected segments.

17. The table saw of claim 16, wherein lateral guard includes a plurality of interconnected segments that are pivotally coupled to the splitter assembly.

18. The table saw of claim 16, wherein the plurality of interconnected segments are coupled for pivotal movement as a unit relative to the splitter as the lateral guard is moved.

19. The table saw of claim 18, wherein the plurality of interconnected segments extend generally parallel to each other when the lateral guard is in the non-cutting position and in the cutting position, and further wherein the plurality of interconnected segments are separated by less than 0.5 inches.

20. The table saw of claim 18, wherein the lateral guard further comprises a base member that interconnects the plurality of interconnected segments and extends proximate the table relative to the top guard.

21. The table saw of claim 16, wherein the plurality of interconnected segments includes a plurality of segments that are at least partially telescoping at least when the lateral guard is in the plurality of cutting positions.

22. The table saw of claim 16, wherein the lateral guard includes a plurality of interconnected segments that include at least a first segment that is connected to the top guard, a second segment that is connected to the first segment and not connected to the top guard, and a third segment that is connected to the second segment and not to the top guard.

* * * * *